United States Patent
Tashiro et al.

(10) Patent No.: US 6,522,941 B1
(45) Date of Patent: Feb. 18, 2003

(54) THREE DIMENSIONAL LINEAR PROCESSING MACHINE AND A METHOD OF COMPOSING AND CONTROLLING MACHINING PROGRAM IN THE THREE DIMENSIONAL LINEAR PROCESSING MACHINE

(75) Inventors: Minoru Tashiro, Kani; Ryoichi Furuhashi, Aichi-ken; Hitoshi Kumazaki, Seki; Hikaru Iryoda, Inuyama, all of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 0 days.

(21) Appl. No.: 09/315,332

(22) Filed: May 20, 1999

(30) Foreign Application Priority Data

May 20, 1998 (JP) ............................ 10-155268

(51) Int. Cl.[7] .............................................. G06F 19/00
(52) U.S. Cl. ..................... 700/180; 700/183; 700/185; 700/186; 700/192; 700/193; 700/195
(58) Field of Search ................................. 700/180, 183, 700/185, 192, 193, 176, 181, 186, 195

(56) References Cited

U.S. PATENT DOCUMENTS

| | | | | |
|---|---|---|---|---|
| 4,190,889 A | * | 2/1980 | Etoh et al. ................... | 700/192 |
| 4,393,449 A | * | 7/1983 | Takeda et al. ............... | 700/185 |
| 4,519,026 A | * | 5/1985 | Nozawa et al. .............. | 700/183 |
| 4,530,046 A | * | 7/1985 | Munekata et al. ........... | 700/86 |
| 4,727,496 A | * | 2/1988 | Ryouki ........................ | 345/441 |
| 4,783,617 A | * | 11/1988 | Kiya ............................ | 318/567 |
| 4,788,636 A | * | 11/1988 | Shiratori et al. ............. | 700/86 |
| 5,224,052 A | * | 6/1993 | Hamar ........................ | 700/192 |
| 5,357,450 A | * | 10/1994 | Hemmerle et al. .......... | 700/176 |
| 5,653,896 A | * | 8/1997 | Couch, Jr. et al. ......... | 219/121.44 |
| 5,661,654 A | * | 8/1997 | Nagashima ................. | 700/176 |
| 5,740,081 A | * | 4/1998 | Suzuki ........................ | 702/94 |

* cited by examiner

Primary Examiner—Leo Picard
Assistant Examiner—Ryan Jarrett
(74) Attorney, Agent, or Firm—Wolf, Block, Schorr and Solis-Cohen LLP; Richard P. Gilly

(57) ABSTRACT

The chuck 10, for positioning and holding a pipe at any rotational angle position around the axial center, is provided with the three dimensional linear processing machine. When the machining program PRO is composed, a plurality of the shape patterns KPT classified machining modes concerning pipes by machining shape is displayed on the display 23. Furthermore, dimensional data item concerning selected shape pattern is displayed on the display 23. Then, the machining program PRO is composed on the basis of the input code parameter CP and the selected shape pattern KPT. Besides, shift quantity TMz and TMy are measured when the pipe to be machined is installed on the chuck 10, and on the basis of this, the machining program PRO is amended and executed.

8 Claims, 11 Drawing Sheets

THREE DIMENSIONAL LINEAR PROCESSING MACHINE AND A METHOD OF COMPOSING AND CONTROLLING MACHINING PROGRAM IN THE THREE DIMENSIONAL LINEAR PROCESSING MACHINE

BACKGROUND OF THE INVENTION

This invention relates to a three dimensional linear processing machine, capable of performing three dimensional machining on a pipe or the like, such as a gas cutting machine, a plasma cutting machine and a three dimensional laser beam machine, and a method of composing and controlling machining program in the three dimensional linear processing machine.

As this kind of the three dimensional processing machine, for instance, a three dimensional laser beam machine, where the direction of a torch injecting laser beam is three dimensionally adjustable, is known. By using this three dimensional laser beam machine, cutting machining on a solid workpiece, such as a pipe, that is, three dimensional cutting machining, can be performed, adding to a plate-shaped workpiece. Three dimensional machining, for instance, cutting a pipe or punching a hole at the side portion of a pipe, is possible. When three dimensional cutting machining on a pipe is performed with such a three dimensional laser beam machine, machining is performed by setting and holding a pipe by a chuck provided on a table side in many cases.

However, in order to compose a machining program necessary for performing three dimensional cutting machining with the above-mentioned three dimensional laser beam machine, it is necessary to designate three dimensional machining route (to be concrete, the route for moving a top end of a torch). In a conventional way, such a machining route is designated by computing with complex calculation or by memorizing shapes by teaching. Furthermore, the method of composing the above-mentioned machining program by a CAD/CAM machine or the like separately provided from the three dimensional laser beam machine is also known. In this method, the final machining form of a workpiece is composed as three dimensional data, machining route is computed by this three dimensional data, and the machining program is composed on the basis of the computed machining route with a CAD/CAM machine or the like. However, long time is necessary for complex calculation or teaching, and skill is also necessary. Besides, the method with the CAD/CAM machine or the like is also inconvenient since it is necessary to provide the CAD/CAM machine or the like separately from the three dimensional laser beam machine.

Besides, when a pipe is set by a chuck, it is necessary to position the central axis of the pipe at a machine center (the axial center of the chuck). But, this positioning operation is difficult to correctly perform. Then, it is necessary to amend the shift of a pipe for correct machining. But, in a conventional three dimensional laser beam machine, such amendment is not easily performed. Even if the machining program is easily composed, performing correct machining by executing this machining program actually is not easy.

OBJECT OF THE INVENTION

Taking the above-mentioned circumstance into consideration, the object of the present invention is to provide a three dimensional linear processing machine and a method of composing and controlling machining program in the three dimensional linear processing machine, where long time or skill is not necessary for composing machining program, a CAD/CAM machine is not necessary to separately provide, the amendment of shift of a workpiece can be easily performed, then the operations from composing machining program to actual machining can be correctly and easily performed.

SUMMARY OF THE INVENTION

Of the present invention, the 1st invention is a three dimensional linear processing machine capable of performing a three dimensional linear machining, such as a three dimensional laser cutting machining, on a pipe, such as workpiece 60, 61, comprising:

a pipe rotating and holding means, such as a chuck 10, capable of positioning and holding the pipe to be machined at any rotational angle position around an axial center of the pipe;

a first memory means, such as a graphic data memory 32, storing machining modes concerning said pipe classified into a plurality of shape patterns, such as a shape pattern KPT, by machining shape;

a second memory means, such as an image information memory 30, storing dimensional data items, such as longitudinal dimension H, lateral dimension W, angle Q, length L and diameter D, necessary for machining of said shape pattern concerning respective shape patterns classified by said machining shape;

a display, such as a display 23;

a shape pattern display control means, such as an image control portion 27 and an image information memory 30, for displaying said plurality of shape patterns on said display, selectable by an operator;

an input means of said shape pattern, such as a keyboard 22;

a dimensional data display control means, such as an image control portion 27, for displaying on said display by selecting dimensional data item concerning said input shape pattern from said dimensional data items stored in said second memory means concerning a specific shape pattern input from said input means of said shape pattern;

an input means of dimensional data, such as a keyboard 22, capable of inputting dimensional data, such as a code parameter CP, corresponding to the dimensional data item on the basis of said dimensional data item displayed on said display;

a linear machining program composing means, a programming composing control portion 26, a solid data producing portion 31, a program computing and composing portion 35, for composing three dimensional laser machining program, such as a machining program PRO, concerning said pipe to be machined on the basis of said dimensional data corresponding to the input dimensional data item and said input shape pattern;

a third memory means, such as a shift quantity detecting program memory 39, for storing a shift quantity detecting program, such as a shift quantity detecting program ZPR, for measuring installation position shift quantity of said pipe, such as a shift quantity in a longitudinal direction TMz and a shift quantity in a lateral direction TMy, with respect to said pipe rotating and holding means when said pipe to be machined is installed on said pipe rotating and holding means;

an installation position shift quantity measuring means, such as a torch 15, a shift quantity detecting operation control portion 37, a driving control portion 40, a moving and driving machine 40a, a movement quantity measuring means 40b, a movement quantity computing portion 41, a shift quantity computing portion 42, an arrival judgment portion 43, a coordinate position detecting portion 51, a coordinate position memory 52 and a distance sensor 70, for reading out said shift quantity detecting program stored in said third memory means and for measuring installation position shift quantity of said pipe held by said pipe rotating and holding means; and a machining control means, such as a driving control portion 40, a machining control portion 46, a laser generating control portion 47 and a program reading amendment, portion 49 for executing said three dimensional linear machining program concerning said pipe to be machined composed by said linear machining program composing means on the basis of measuring result of said installation position shift quantity measuring means, amending said installation position shift quantity by said pipe rotating and holding means, and for machining said pipe to be machined held by said pipe rotating and holding means.

Accordingly, when a machining program is composed, an operator can intuitively, visually, easily select shape patterns corresponding to a machining mode of a pipe to be machined watching a plurality of shape patterns displayed on the display. Furthermore, since the dimensional data items concerning the shape pattern are displayed on the display by inputting specific shape pattern corresponding to the machining mode through the input means of the shape pattern, it is possible to correctly acknowledge the dimensional data item necessary for inputting dimensional data, watching this display, and to input the dimensional data corresponding to this without errors.

Besides, since the three dimensional linear machining program concerning the pipe to be machined is automatically composed on the basis of the shape pattern and the dimensional data selected and input in this way, complex calculation by a hand or teaching as in the past is not necessary. Then, long time or skill is not necessary to compose machining program. Besides, since CAD/CAM machine or the like is not necessary to separately provide, it is convenient.

Besides, in the present invention, the installation position shift quantity when a pipe to be machined is installed on the pipe rotating and holding means is measured and the linear machining program is executed amending this installation position shift quantity. Then, even if the pipe is not correctly installed on the pipe rotating and holding means, correct machining is easily realized since this installation position shift quantity is automatically amended at the time of machining. That is, in the present invention, the operations from composing machining program to actual machining can be correctly and easily performed.

Besides, of the present invention, the 2nd invention is the three dimensional linear processing machine as set forth in the 1st invention, wherein said shape pattern has a plurality of shape patterns concerning a square pipe which section is square.

Accordingly, in addition to the effects of the 1st invention, since composing machining program concerning a square pipe is easily performed, it is convenient.

Besides, of the present invention, the 3rd invention is the three dimensional linear processing machine as set forth in the 10st invention, wherein said shape pattern has a plurality of shape patterns concerning a round pipe which section is round.

Accordingly, in addition to the effects of the 1st invention, since composing machining program concerning a round pipe is easily performed, it is convenient.

Of the present invention, the 4th invention is the three dimensional linear processing machine according to the 1st invention, wherein a plurality of the shift quantity detecting program for measuring installation position shift quantity of said pipe with respect to said pipe rotating and holding means are provided corresponding to said shape patterns, and the installation position shift quantity measuring means for measuring the installation position shift quantity of said pipe held by said pipe rotating and holding means reads out and executes the shift quantity detecting program corresponding to said input shape pattern.

Accordingly, by executing the shift quantity detecting program corresponding to the shape pattern, the measurement of the installation position shift quantity is accurately performed according to the shape of a pipe or the machining mode of the pipe to be machined, in addition to the effects according to the 1st invention. In the result, the amendment when the linear machining program is executed is accurate, and further accurate machining is realized.

Of the present invention, the 5th invention is a method of composing and controlling machining program in a three dimensional linear processing machine, said three dimensional linear processing machine capable of performing a three dimensional linear cutting machining on a pipe, said machine further comprising:

a pipe rotating and holding means, capable of positioning and holding the pipe to be machined at any rotational angle position around an axial center of the pipe;

a first memory means for storing machining modes concerning said pipe classified into a plurality of shape patterns by machining shape;

a second memory means for storing dimensional data items necessary for machining of said shape pattern concerning respective shape patterns classified by said machining shape;

a display;

a shape pattern display control means for displaying said plurality of shape patterns on said display, selectable by an operator;

an input means of said shape pattern;

a dimensional data display control means for displaying on said display by selecting dimensional data item concerning said input shape pattern from said dimensional data items stored in said second memory means concerning a specific shape pattern input from said input means of said shape pattern;

an input means of dimensional data capable of inputting dimensional data corresponding to said dimensional data item on the basis of said dimensional data item displayed on said display;

a linear machining program composing means for composing three dimensional linear machining program concerning said pipe to be machined on the basis of said dimensional data corresponding to the input dimensional data item and said input shape pattern;

a third memory means for storing a shift quantity detecting program for measuring installation position shift quantity of said pipe with respect to said pipe rotating and holding means when said pipe to be machined is installed on said pipe rotating and holding means;

an installation position shift quantity measuring means for reading out said shift quantity detecting program stored in said third memory means and for measuring installation position shift quantity of said pipe held by said pipe rotating and holding means; and a machining control means for executing said three dimensional linear machining program concerning said pipe to be machined composed by said laser machining program composing means on the basis of measuring result of said installation position shift quantity measuring means, amending said installation position shift quantity by said pipe rotating and holding means, and for machining said pipe to be machined held by said pipe rotating and holding means; said method comprising:

when machining program is composed;

indicating to an operator a plurality of shape patterns stored in said first memory means by said shape pattern display control means through said display;

indicating to an operator dimensional data items concerning said input shape pattern through said display selected from said second memory means by said dimensional data display control means concerning specific shape pattern input by an operator through said input means of said shape pattern corresponding to the indication of said shape pattern;

composing a three dimensional linear machining program concerning a pipe to be machined by said linear machining program composing means on the basis of dimensional data concerning said specific shape pattern input by an operator through said input means of said dimensional data corresponding to the indication of said dimensional data item; and inputting various kinds of data when machining program is composed with interactive mode between an operator and the three dimensional linear processing machine.

Accordingly, anyone can easily compose machining program with interactive mode even if an operator is not a skilled man.

DESCRIPTION OF THE PREFERRED EMBODIMENT

Embodiments of the present invention will now be described hereinafter with respect to the accompanying drawings.

Figure 1:
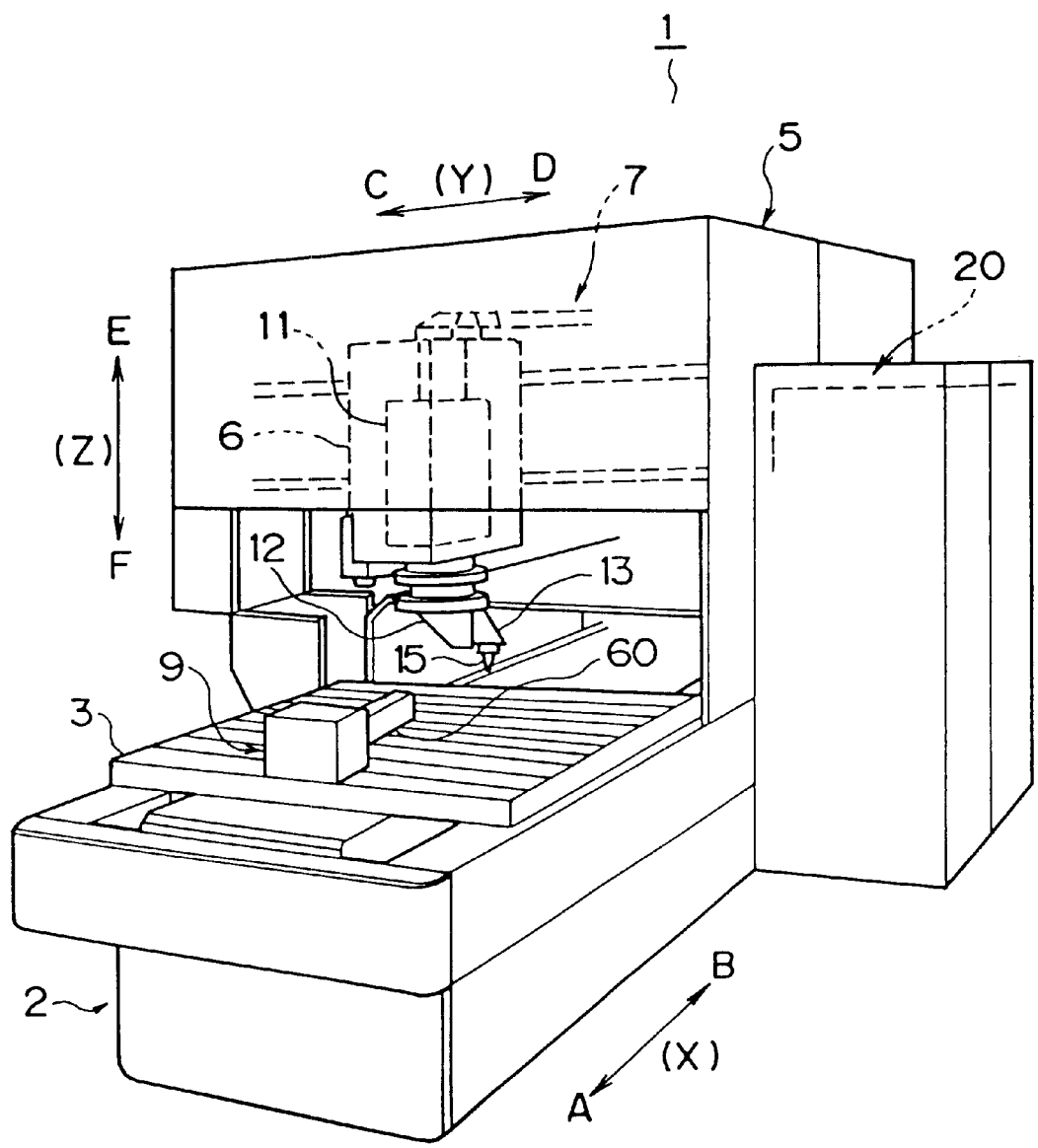
FIG. 1 is a view obliquely seen, showing a whole of a laser beam machine which is an example of a three dimensional linear processing machine according to the present invention.
Figure 2:
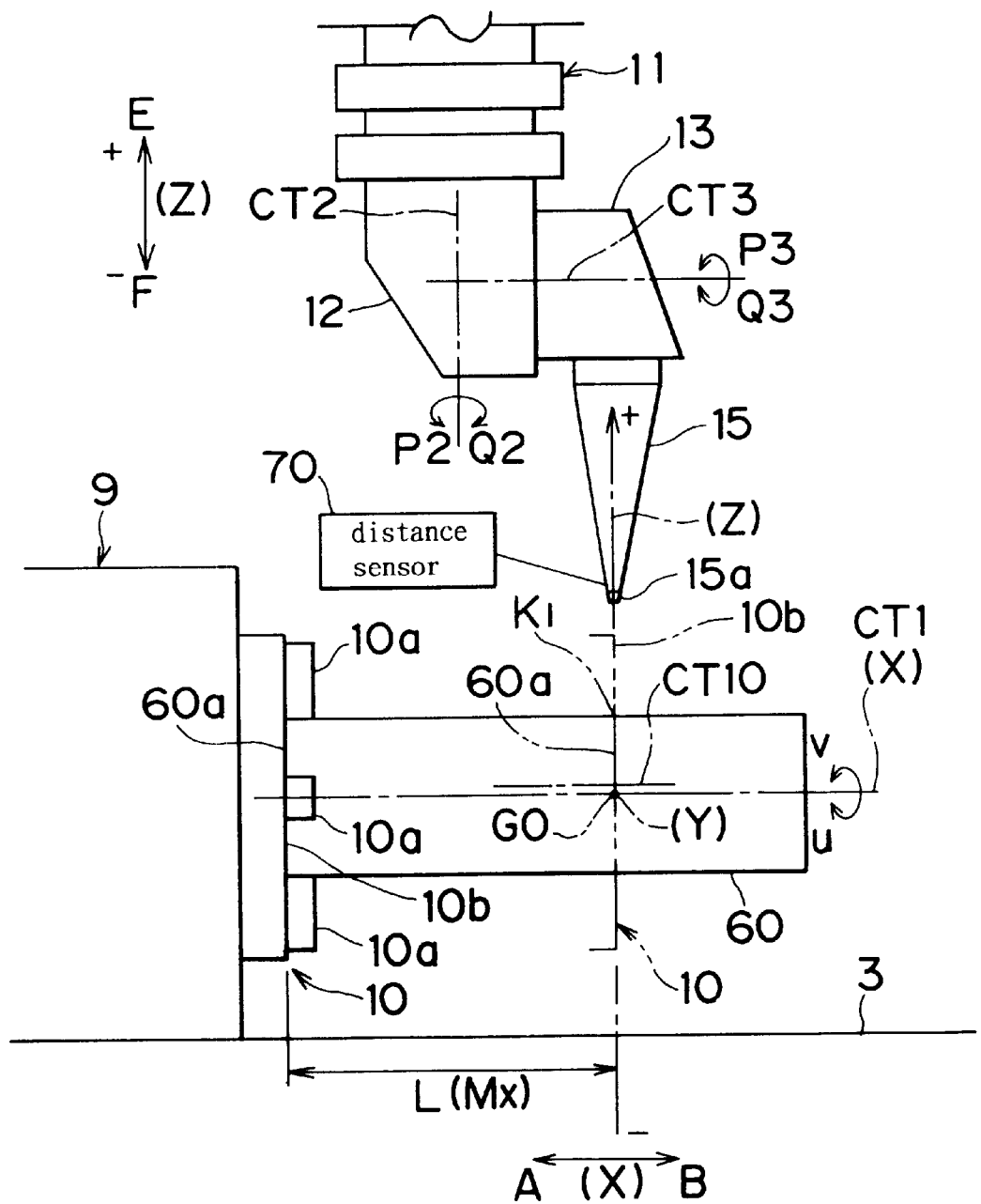
FIG. 2 is a side view showing near a chuck in the laser beam machine of FIG. 1.

A laser beam machine 1, which is an embodiment of the present invention, has a base 2, as shown in FIG. 1. A table 3 for setting a workpiece is provided with the base 2, movably and drivably in a horizontal direction with respect to the base 2, that is, in a direction as shown by arrows A and B (X-axis direction) in the figure. A chuck machine 9 is provided with the table 3, as shown in FIGS. 1 and 2. The chuck machine 9 has a chuck 10, which is free to rotate and position in direction as shown by the arrows U and V of FIG. 2 with an axial center CT1 corresponding with the X-axis as its center. The chuck 10 has a plurality of claws 10a at the top end thereof (the end of the arrow B side of FIG. 2), a workpiece 60, such as a pipe (a square pipe in FIG. 1), is attachably and detachably grasped and located in parallel to the X-axis direction by these claws 10a.

As shown in FIG. 1, a column 5 is provided with the base 2 in a direction as shown by the arrows C and D perpendicular to the direction as shown by the arrows A and B as described before, striding the table 3. A saddle 6 is provided with the column 5, movably and drivably in the direction as shown by the arrows C and D (Y-axis direction). A head body 11 is provided with the saddle 6, movable and drivable in up and down direction with respect to the saddle 6, that is, the direction as shown by the arrows E and F(Z-axis direction) in the figure. A first head member 12 is provided with the head body 11 on its lower end side, free to rotate and drive with respect to the head body 11, in direction as shown by the arrows P2 and Q2 of the figure, with a predetermined central axis CT2, parallel to the Z-axis direction as its center, as shown in FIG. 2.

Furthermore, a second head member 13 is provided with the first head member 12 at its side portion, free to rotate and drive with respect to the first head member 12, in a direction as shown by arrows P3 and Q3 in the figure, with a predetermined central axis CT3 perpendicular to the central axis CT2 as its center. A torch 15 is provided with the second head member 13, extending in the direction perpendicular to the axial center CT3. Besides, a laser generator (not shown) is provided on the column 5 side. The laser beam generated by this laser generator is supplied in the head body 11 by a proper laser beam tube 7, as shown in FIG. 1.

The laser beam supplied in the head body 11 is further supplied in the torch 15 via the first head member 12 and the second head member 13, so as to project outside from the top end of the torch 15. A condensing lens (not shown) is provided between the head body 11 and the torch 15, for instance, in the second head member 13, and the abovementioned laser beam is supplied to the torch 15 through the condensing lens.

Figure 3:
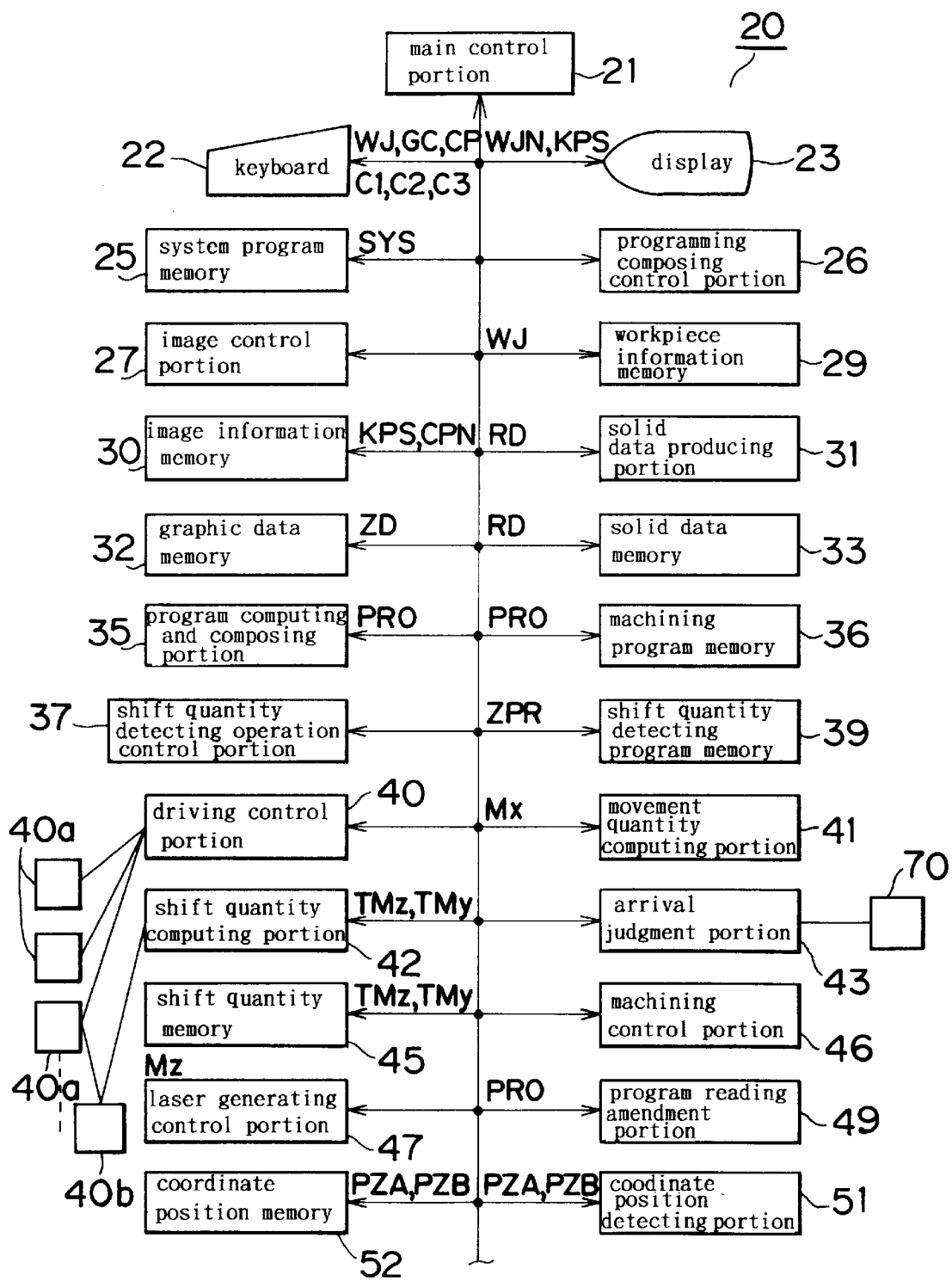
FIG. 3 is a block diagram showing a control machine in the laser beam machine of FIG. 1.

Besides, the laser beam machine 1 has a control unit 20 as shown in FIG. 3, and the control unit 20 has a main control portion 21. A keyboard 22, a display 23, a system program memory 25, a programming composing control portion 26, an image control portion 27, a workpiece information memory 29, an image information memory 30, a solid data producing portion 31, a graphic data memory 32, a solid data memory 33, a program computing and composing portion 35, a machining program memory 36, a shift quantity detecting operation control portion 37, a shift quantity detecting program memory 39, a driving control portion 40, a movement quantity computing portion 41, a shift quantity computing portion 42, an arrival judgment portion 43, a shift quantity memory 45, a machining control portion 46, a laser generating control portion 47, a program reading amendment portion 49, a coordinate position detecting portion 51, a coordinate position memory 52 are connected with the main control portion 21 through a bus line.

The laser beam machine 1 has the structure as mentioned before. So, a three dimensional cutting machining on the workpiece 60, such as a pipe, with this laser beam machine 1 is executed as shown below.

Figure 8:
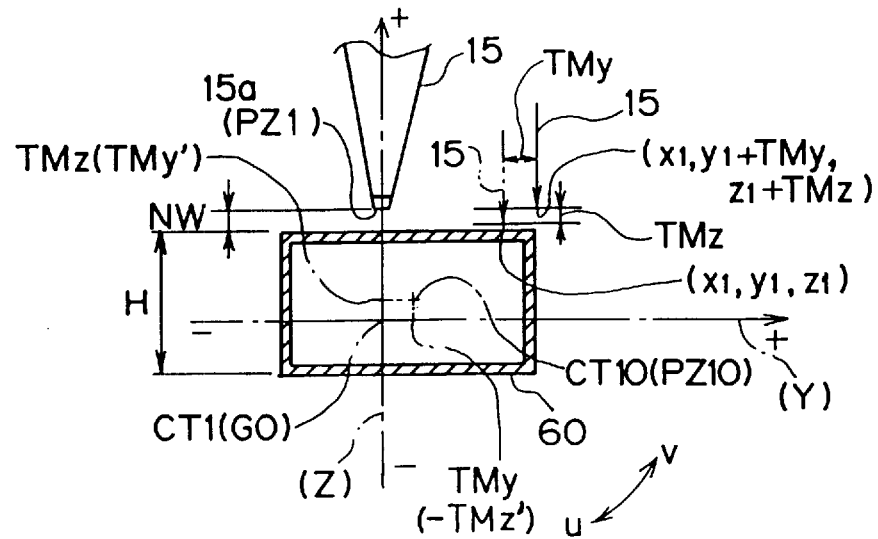
FIG. 8 is a view showing the state that shift quantity is detected concerning a workpiece which is a square pipe.

That is, firstly, a worker puts the workpiece 60 to be machined on the laser beam machine 1. The workpiece 60 to be used in this embodiment is a square pipe which section perpendicular to the longitudinal direction is a rectangle, as shown in FIGS. 2 and 8. The setting of this workpiece 60 is executed in such a manner that one end side of the workpiece 60 (the left side of paper face of FIG. 2) is grasped by the chuck 10 of the chuck machine 9 through a plurality of claws 10a as shown in FIG. 2. In time of this grasp, the workpiece 60 is positioned to locate such that a central axis CT10 of the workpiece 60 is corresponded with the axial center CT1 (X-axis) of the chuck 10 to the utmost. In this embodiment, the central axis CT10 of the workpiece 60 and the axial center CT1 of the chuck 10 are not completely corresponded with each other in this setting, as shown in FIGS. 2 and 8, so a shift is generated. This setting operation of the workpiece 60 may be executed after a machining program PRO described hereinafter is produced.

Figure 4:
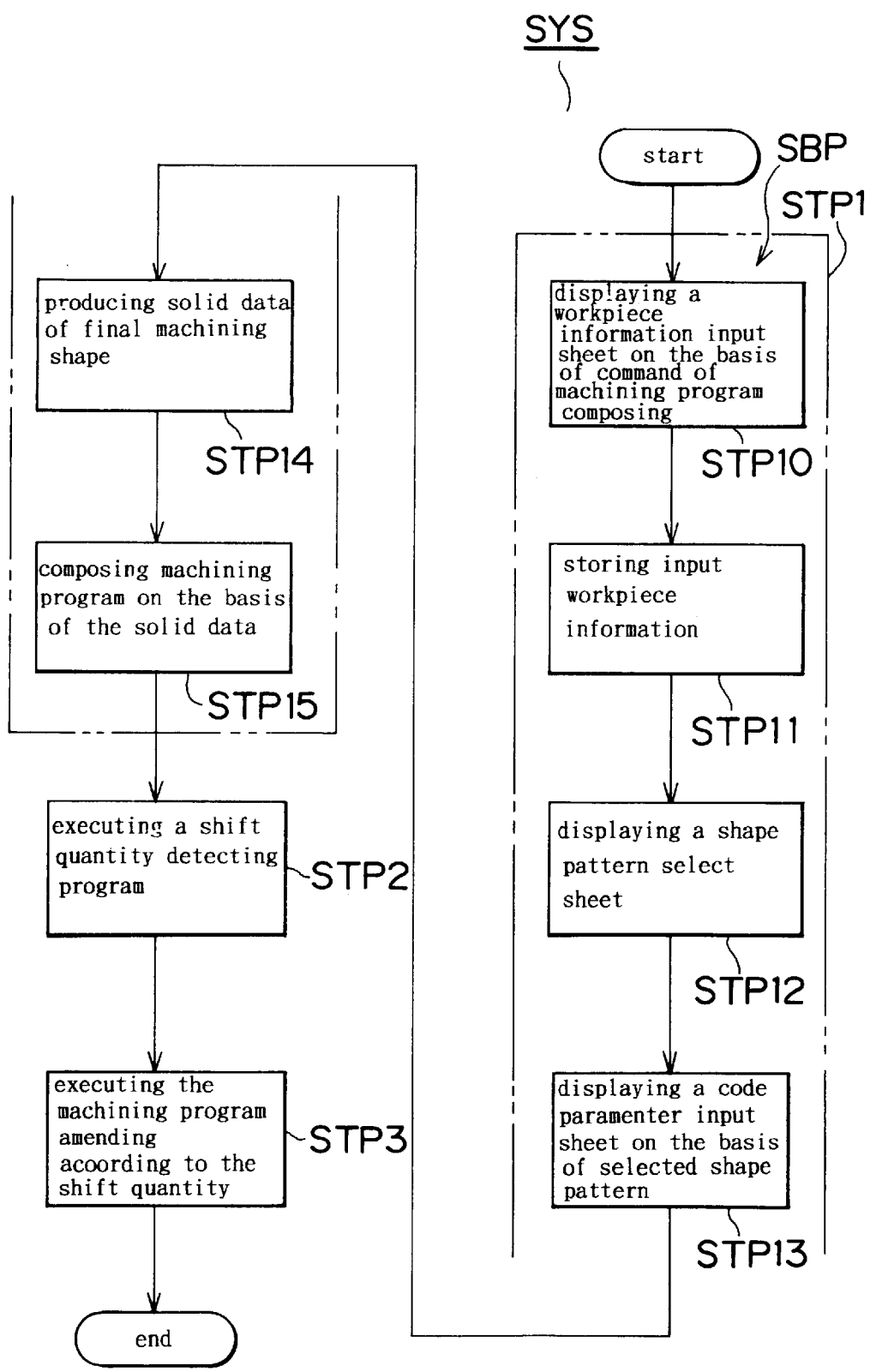
FIG. 4 is a flowchart showing contents of a system program.

After the workpiece is set in this way, an operator (a worker) inputs start command through a start switch (not shown) of the control unit 20 which is on the keyboard 22 or the like. The main control portion 21 receiving this command reads out a system program SYS stored in the system program memory 25. Thereafter, steps STP1, STP2 and STP3 as shown in FIG. 4 are proceeded by the main control portion 21 in order, according to the read system program SYS.

At first, an operator inputs a command C1 of composing a machining programming through the keyboard 22, and the input command C1 is transferred to the main control portion 21. The main control portion 21 receiving the command C1 enters into the step STP1 so as to instruct the programming composing control portion 26 to compose the machining program PRO. The programming composing control portion 26 receiving this executes a sub-program SBP comprising steps STP10 through STP15 as shown in FIG. 4. That is, the programming composing control portion 26 instructs the image control portion 27 to display a workpiece information input sheet WJN. Accordingly, the image control portion 27 displays the workpiece information input sheet WJN (not shown) which demands input of workpiece information WJ, such as material, thickness and dimension of the workpiece to be machined through the display 23 (the step STP10 in FIG. 4). An operator inputs the workpiece information WJ, such as the material, thickness and the dimension of the workpiece 60 installed on the chuck 10 through the keyboard 22, while watching the display 23. The input workpiece information WJ is transferred to the programming composing control portion 26, the programming composing control portion 26 stores the received workpiece information WJ in the workpiece information memory 29 (the step STP11 of FIG. 4).

Figure 5:
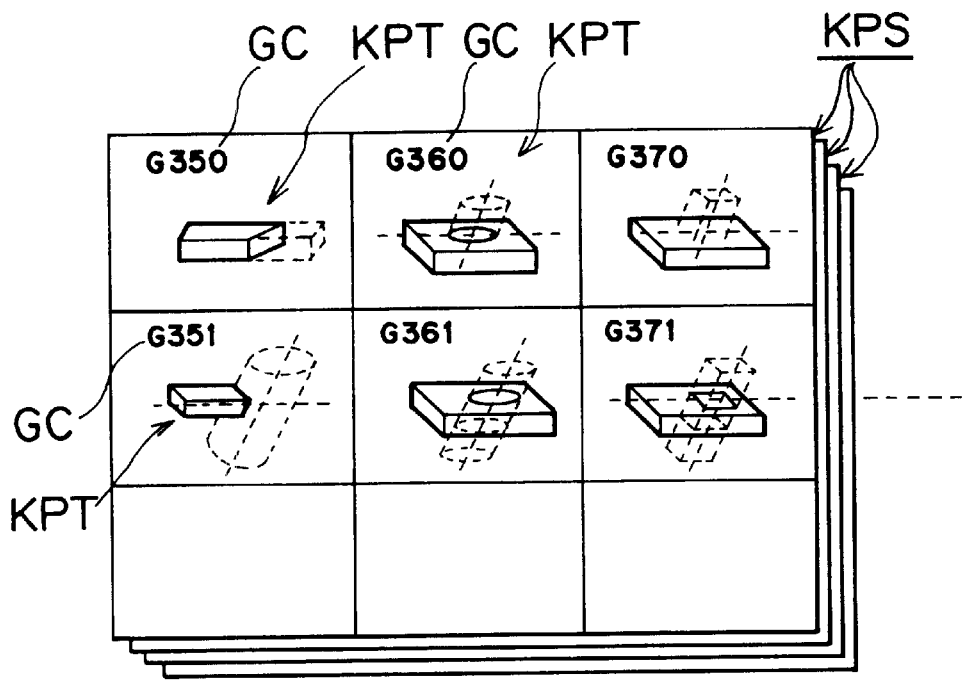
FIG. 5 is a view showing a shape pattern select sheet as image.
Figure 10:
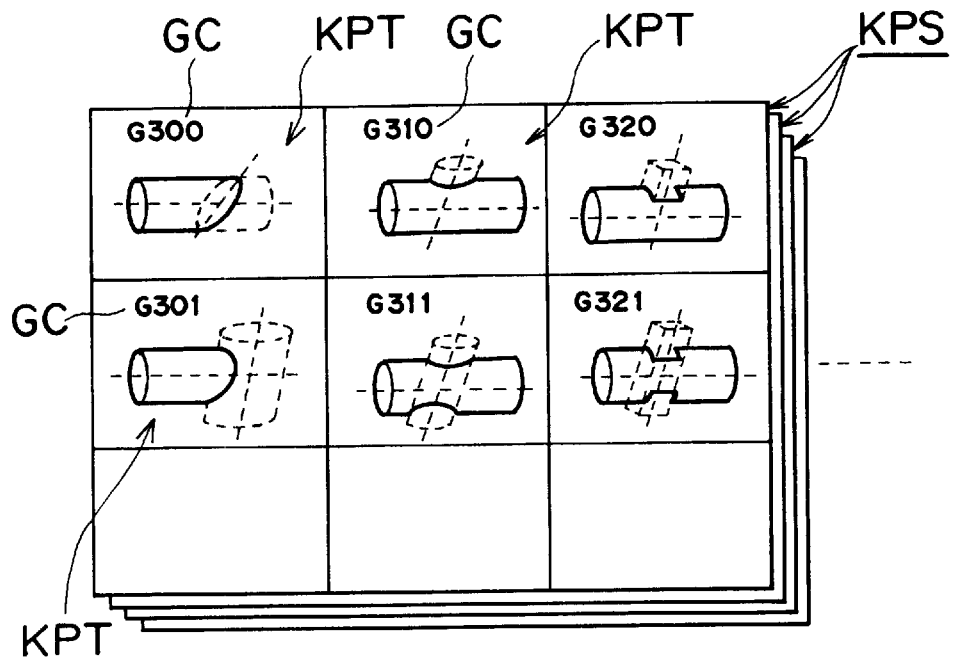
FIG. 10 is a view showing an another shape pattern select sheet as image.

After the step STP11 before-mentioned, the programming composing control portion 26 instructs the image control portion 27 to display a shape pattern select sheet KPS. That is, the image control portion 27 displays the shape pattern select sheet KPS which demands the selecting a shape pattern KPT to be machined concerning the workpiece 60, by reading out the image information memory 30 through the display 23 (the step STP12 of FIG. 4). That is, a plurality of shape pattern select sheets KPS which are shown as image in FIGS. 5 or 10, are stored in the image information memory 30 as digital data. Then, the image control portion 27 displays the first shape pattern select sheet KPS of these shape pattern select sheets KPS through the display 23, for instance, as shown in FIG. 5. If an operator inputs a command C3 for sheet switch through the keyboard 22 while a shape pattern select sheet KPS is displayed on the display 23, the command C3 is transferred to the programming composing control portion 26, the programming composing control portion 26 receiving this instructs the image control portion 27 to display a next shape pattern select sheet KSP. Accordingly, a next shape pattern select she et KPS is read out from the image information memory 30 so as to display through the display 23 by the image control portion 27. By inputting the commands C3 for sheet switch in order through the keyboard 22 by an operator in the above-mentioned way, the shape pattern select sheets KPS to be displayed on the display 23 can be switched in order.

Each shape pattern select sheet KPS is for each workpiece to be machined. For instance, the shape pattern select sheet KPS as shown in FIG. 5 is for a workpiece of a square pipe, and for instance, the shape pattern select sheet KPS as shown in FIG. 10 is for a workpiece of a round pipe. There may be the shape pattern select sheets KPS for the workpiece having the shape excluding a square pipe and a round pipe (not shown).

Contents of the shape pattern select sheet KPS will now be explained. In case of a square pipe as shown in FIG. 5, for instance, the final machining shape concerning the workpiece which is a square pipe is classified into 6 shape patterns KPT as a pattern with no consideration to dimension or the like. A code GC for recognition is affixed to each of these shape pattern KPT. On this occasion, the number of the shape patterns KPT is not always 6, and any number is accepted.

As shown in FIG. 5, the codes GC are affixed in such a manner that the shape made by the end machining cutting one side of a workpiece by a plane is ⌈G350⌋, the shape made by the end machining cutting one side of a workpice by a cylindrical curved face is ⌈G351⌋, the shape having the hole made when a cylinder is inserted into a side portion of a workpiece by hole machining (the hole does not penetrate the workpiece) is ⌈G360⌋, the shape having the hole made when a cylinder is inserted into a side portion of a workpice by hole machining (the hole penetrates the workpiece) is ⌈G361⌋, the shape having the hole made when a square cylinder is inserted into a side portion of a workpiece by hole machining (the hole does not penetrate the workpiece)is ⌈G370⌋, and the shape having the hole made when a square cylinder is inserted into a side portion of a workpiece by hole machining (the hole penetrates the workpiece) is ⌈G371⌋.

Besides, in case of a round pipe as shown in FIG. 10, for instance, the final machining shape concerning a workpiece of a round pipe is classified into 6 2 shape patterns KPT, for instance. The code GC is affixed to each shape pattern KPT of these. As shown in FIG. 10, the codes GC are affixed in such a manner that the shape made by end machining cutting one side of a workpiece by a plane is ⌈G300⌋, the shape made by end machining cutting one side of a workpiece by cylindrical curved face is ⌈G301⌋, the shape having the hole made when a cylinder is inserted into a side part of a workpiece by hole machining (the hole does not penetrate the workpiece)is ⌈G310⌋, the shape having the hole made when a cylinder is inserted into a side part of a workpiece by hole machining (the hole penetrates the workpiece) is ⌈G311⌋, the shape having the hole made when a square cylinder is inserted into a side part of a workpiece by hole machining (the hole does not penetrate the workpiece) is ⌈G320⌋, and the shape having the hole made when a square cylinder is inserted into a side part of a workpiece by hole machining (the hole penetrates the workpiece) is ⌈G321⌋.

The respective shape patterns KPT are located on a chart, as shown in FIGS. 5 and 10, and the code GC concerning the shape pattern KPT and the thumbnail which the shape pattern KPT is shown as simplified graphic are located on the section of each shape pattern KPT.

An operator inputs the command for sheet switch C3 through the keyboard 22 in order to switch the shape pattern select sheet KPS to be displayed on the display 23, then, the shape pattern select sheet KPS according to the shape of a workpiece to be machined is displayed on the display 23, and an operator selects one of the shape patterns KPT shown on the shape pattern select sheet KPS while watching displayed shape pattern select sheet KPS. In case where a workpiece is a square pipe, for instance, the shape pattern select sheet KPS as shown in FIG. 5 is displayed. Furthermore, in case where a desired machining is end machining cutting a side of a workpiece by a plane, for instance, the code GC of ⌈G350⌋ as shown in FIG. 5 is input so as to select the shape pattern KPT having the code GC of ⌈G350⌋. In case where a workpiece of a square pipe is machined by another machining, the code GC, such as ⌈G351⌋ ⌈G360⌋, and ⌈G361⌋, . . . , as shown in FIG. 5, is input so as to select the shape pattern KPT having the input code GC in the same way as mentioned.

In case where a workpiece is a round pipe, for instance, the shape pattern select sheet KPS as shown in FIG. 10 is displayed, and furthermore, in case where the desired machining is the end machining cutting a side of a workpiece by a plane, for instance, the code GC of ⌈G300⌋ as shown in FIG. 10 is input so as to select the shape pattern KPT having the code GC of ⌈G300⌋. In case where a workpiece of a round pipe is machined by another machining, the code GC, such as ⌈G301⌋, ⌈G310⌋, and ⌈G311⌋, . . . , as shown in FIG. 10 is input so as to select the shape pattern KPT having the input code GC, in the same way as the above-mentioned.

Since the workpiece 60 is a square pipe and the desired machining is end machining cutting a side of a workpiece by a plane in the present embodiment, an operator inputs the code GC of ⌈G350⌋ as shown in FIG. 5 so as to select the shape pattern KPT having the code GC of ⌈G350⌋. The input code GC is transferred to the programming composing control portion 26 so as to be stored by the programming control portion 26. The programming composing control portion 26 instructs the image control portion 27 to display a code parameter input sheet CPN on the basis of the stored code GC. Then, the image control portion 27 reads out the code parameter input sheet CPN demanding inputting a code parameter CP concerning the selected shape pattern KPT from the image information memory 30 so as to be displayed through the display 23 (step STP13 of FIG. 4).

Figure 6:
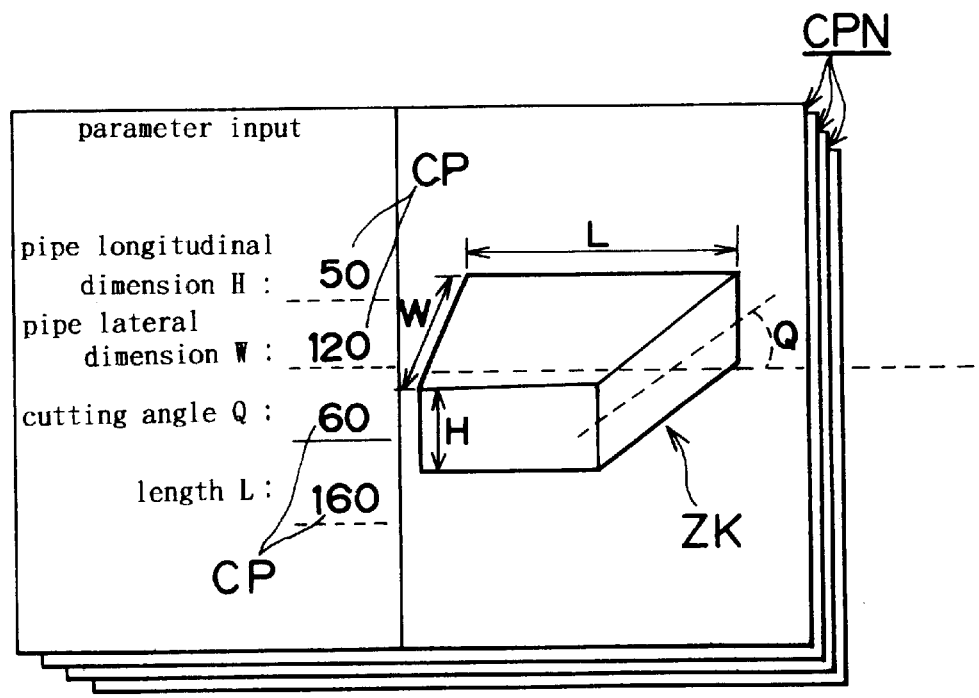
FIG. 6 is a view showing a code parameter input sheet as image.
Figure 11:
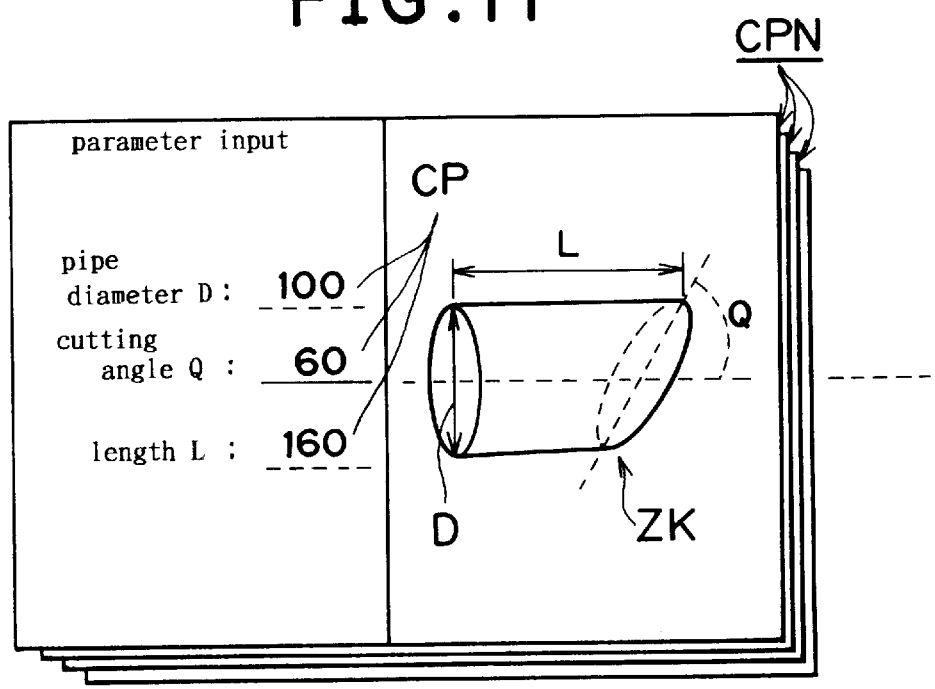
FIG. 11 is a view showing an another code parameter input sheet as image.

That is, a plurality of code parameter input sheets CPN as shown in FIG. 6 or 11 as an image are stored in the image information memory 30 as digital data corresponding to the above-mentioned respective shape patterns KPT, that is, corresponding with 1 to 1 with the code GC. The image control portion 27 displays the code parameter input sheet CPN based on the code GC stored by the programming composing control portion 26 of these code parameter input sheets CPN through the display 23.

Since the code GC of ⌈G350⌋ is stored in the programming composing control portion 26 in the present embodiment, the code parameter input sheet CPN as shown in FIG. 6 is displayed on the display 23. A graphic display area is provided with this code parameter input sheet CPN, on the right side of the scope as shown in FIG. 6 so as to display a graphic ZK of selected shape pattern KPT on this area. On this occasion, graphic data ZD of the corresponding code GC is read out from the graphic data memory 32 after-mentioned so as to display the graphic ZK. Besides, a parameter display area is provided on the left side of the sheet. The names of dimensions and the like to be given to the selected shape pattern KPT are shown as ⌈pipe longitudinal dimension H⌋, ⌈pipe lateral dimension W⌋, ⌈cutting angle Q⌋ ⌈length L⌋ on this area in order to make final machining shape. Values (code parameter CP) can be input and displayed on the right side of a paper face of these respective name through a cursor.

The code parameter input scope CPN of FIG. 6 will now be explained. ⌈Pipe longitudinal dimension H⌋ is longitudinal dimension H as a height of the workpiece 60 which is a square pipe in Z-axis direction, ⌈pipe lateral dimension W⌋ is lateral dimension W as the width in the Y-axis direction, ⌈cutting angle Q⌋ is the angle Q crossing the plane cutting the workpiece 60 and the central axis of the workpiece 60, and ⌈length L⌋is the length L of the workpiece 60 from the end face to the cutting position in X-axis direction.

Then, an operator watching this code parameter input sheet CPN input desired values in order on the display positions of each code parameter CP by referring to drafting drawing through the keyboard 22 by a cursor on the scope. The code parameters CP, such as the input longitudinal dimension H, lateral dimension W, length L and angle Q are transferred to the programming composing control portion 26, and the programming composing control portion 26 stores the transferred code parameter CP. When the code parameter input sheet CPN is displayed, the overlapped data with the workpiece information WJ stored in the workpiece information memory 29 at the step STP2 above-mentioned of the code parameters CP to be input, for instance, the longitudinal dimension H, the lateral dimension W and the like of the workpiece 60 may be read out from the workpiece information memory 29 by the programming composing control portion 26 so as to transfer them to the image control portion 27, then the image control portion 27 may input the transferred longitudinal dimension H, the lateral dimension W and the like as default values in advance on the side of the corresponding item as shown in FIG. 6.

When an operator selects the shape pattern KPT having the code GC excluding ⌈G350⌋, the code parameter input sheet CPN corresponding to the code GC of the selected shape pattern KPT is displayed on the display 23, as explained before. Since the code parameter CP necessary for each shape pattern KPT is different, the contents of the code parameter input sheet CPN is naturally different. For instance, when an operator selects the shape pattern KPT having the code GC of ⌈G300⌋ (refer to FIG. 10), the code parameter input sheet CPN as shown in FIG. 11 is displayed.

As shown in FIG. 11, concerning this code parameter input sheet CPN, the graphic display area for displaying the graphic ZK of the selected shape pattern KPT is provided on the right side of the scope in a similar way as the example of FIG. 6 before-mentioned, and the parameter display area is provided on the left side of the scope. However, the items of the code parameter CP in the parameter display area are different. In case of FIG. 11, the diameter D of a workpiece which is a round pipe is shown as [pipe diameter D], the angle Q crossing the plane cutting a workpiece and the central axis of the workpiece is shown as [cutting angle Q], and the length L of the workpiece from the end face to the cutting position is shown as [length ].

When the input of the code parameter CP finishes, the programming composing control portion 26 instructs the solid data producing portion 31 to produce solid data RD (step STP14 of FIG. 4). The graphic data ZD of the shape pattern KPT which the code GC shows, corresponding to each code GC are stored in the graphic data memory 32. Accordingly, the solid data producing portion 31 receiving command for producing the solid data RD before-mentioned reads out the code GC and the code parameter CP stored in the programming composing control portion 26, and furthermore, reads out the graphic data ZD corresponding to the code GC of the graphic data ZD stored in the graphic data memory 32 so as to produce concrete solid data RD of the final machining shape concerning the workpiece 60 on the basis of these code parameter CP and the graphic data ZD.

The produced solid data RD is transferred to the solid data memory 33 so as to be stored. The solid data producing portion 31 transfers the produced solid data RD to the image control portion 27, and the image control portion 27 receiving this displays the solid data RD on the display 23. For instance, the code parameter input sheet CPN as shown in FIG. 6 is displayed, and this is displayed in such a manner that the graphic ZK on the right side of the sheet CPN is made into the graphic with the solid data RD dimensionally corresponding to the final machining shape to be machined.

Thereafter, the programming composing control portion 26 instructs the program computing and composing portion 35 to compute and compose the machining program PRO, and the program computing and composing portion 35 receiving this computes and composes the machining program PRO on the basis of the solid data RD stored in the solid data memory 33, using a well-known computing method which the machining program PRO is composed by specifying the machining path from solid data, which is used in a conventional CAD/CAM machine or the like (step STP15 in FIG. 4). The program computing and composing portion 35 stores the composed machining program PRO in the machining program memory 36. Then, the execution of the sub-program SBP by the programming composing control portion 26 finishes, and the machining program PRO is composed. Accordingly, the step STP1 as shown in FIG. 4 finishes.

Concerning the method of composing the machining program, that is, concerning the contents of the sub-program SBP, another contents excluding ones shown in the present embodiment can be adopted.

When the step STP1 finishes, the step STP2 of FIG. 4 starts. Since the workpiece 60 set on the chuck 10 is shifted with respect to the central axis CT1 of the chuck 10 in the Y-axis and the Z-axis directions in its central axis CT10 as mentioned before, as shown in FIG. 2 and the like, it is necessary to amend this shift at machining time. Besides, in order to amend in this way, it is necessary to detect the quantity of the shift between the central axis CT10 of the workpiece 60 and the axial center CT1.

At the step STP2 explained hereunder, the quantity of the shift between the central axis CT10 of the workpiece 60 and the axial center CT1 is detected. In the laser beam machine 1, for instance, an origin GO of X, Y, Z three dimensional coordinates can be set at a predetermined position on the X-axis always corresponding with the axial center CT1 of the chuck 10 by a well-known coordinate system setting operation, such as G code [G92], and the origin GO is set at the position of a front end face 10b of the chuck 10 as an example in the present embodiment. When the step STP1 finishes, the main control portion 21 acknowledges finish of installation of the workpiece 60 to be machined on the chuck 10 from the input by an operator or by a proper means, such as a sensor, and thereafter, instructs the shift quantity detecting operation control portion 37 to execute a shift quantity detecting program ZPR (step STP2 of FIG. 4).

Figure 7:
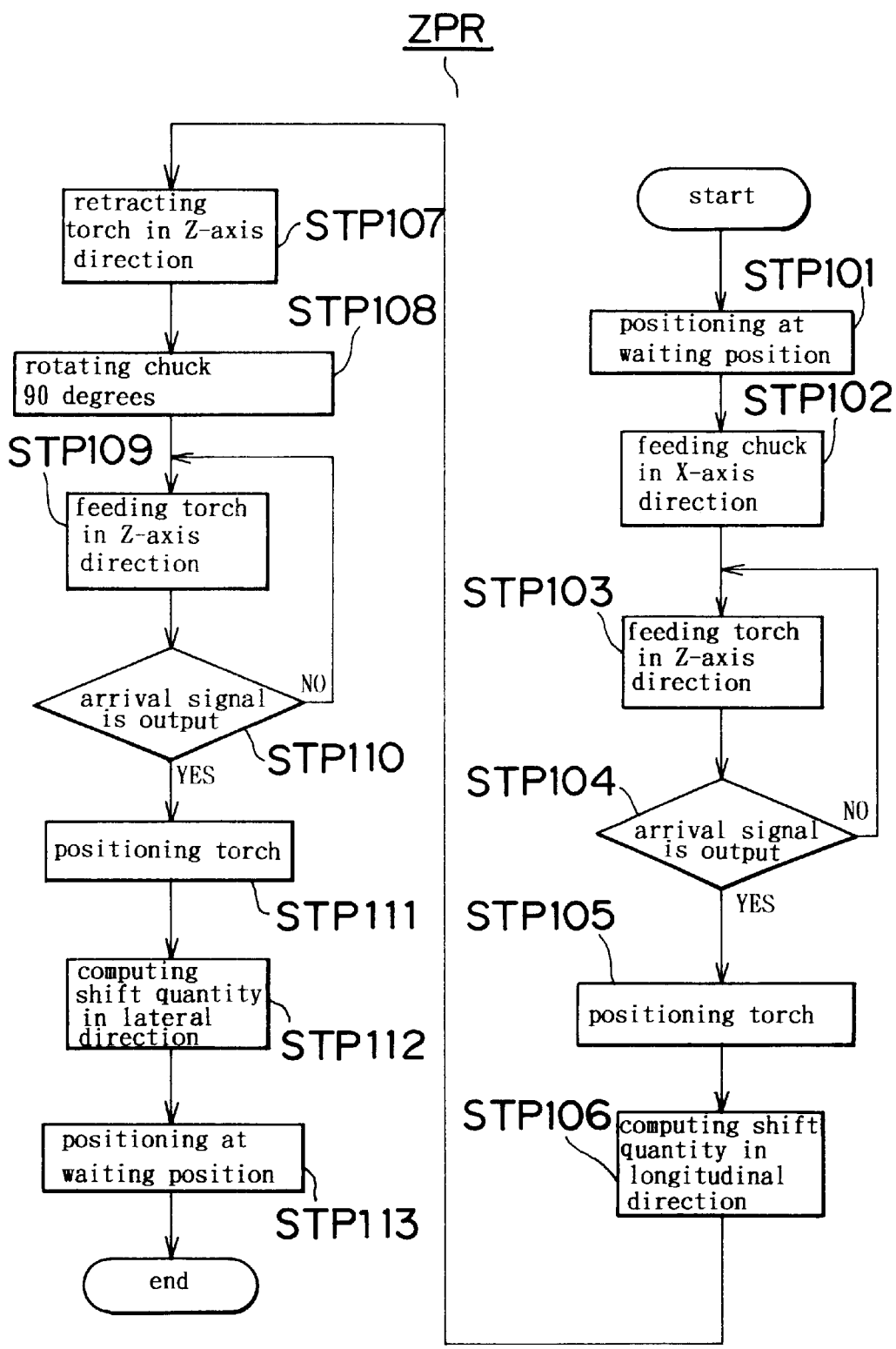
FIG. 7 is a flowchart showing contents of a shift quantity detecting program.

The shift quantity detecting operation control portion 37 receiving this reads out the shift quantity detecting program ZPR stored in the shift quantity detecting program memory 39 so as to advance the process on the basis of the shift quantity detecting program ZPR as shown in FIG. 7. On this occasion, concerning this shift quantity detecting program ZPR, the different program is stored for each shape pattern KPT selected at the step STP1. But, in the present embodiment, this program is stored for each shape of a workpiece, that is, for each shape, such as a square pipe and a round pipe. Accordingly, in case of a square pipe, the shift quantity detecting program ZPR corresponding to a square pipe is read out.

At first, the shift quantity detecting operation control portion 37 instructs the driving control portion 40 to position the machine at a waiting position (step STP101 of FIG. 7). The driving control portion 40 receiving this moves and drives the table 3, the saddle 6, the head body 11, the first head member 12, the second head member 13 so as to position at predetermined waiting positions through a moving and driving machine 40a for moving and driving them. Besides, the driving control portion 40 rotates and drives the chuck 10 so as to position it at an orient position (the position where the rotational angle is 0) through the moving and driving machine 40a for rotating and driving the chuck 10. In such a state that the table 3, the saddle 6, the head body 11, the first head member 12 and the second head member 13 are positioned at respective waiting positions, as shown by the two dot chain line of FIG. 2, the front end face 10b of the chuck 10 is located at the position of the origin GO which is the intersecting point of the X-axis, the Y-axis and the Z-axis, and the torch 15 is located along the Z-axis, locating its top end 15a on the Z-axis. After the step STP101 finishes, the shift quantity detecting operation control portion 37 instructs the movement quantity computing portion 41 to compute movement quantity Mx in the X-axis direction. The movement quantity computing portion 41 receiving this computes the movement quantity Mx of the workpiece 60, that is, the chuck 10 on the basis of the length L from a workpiece end face 60a to a cutting position KI of the code parameters CP stored in the programming control portion 26. On this occasion, in the present embodiment, since the origin GO of the coordinate is set at the position of the front end face 10b of the chuck 10, that is, at the position of the workpiece end face 60a, the movement quantity Mx is the length from the end face 60a to the cutting position KI. However, the position of the origin GO is not always at the front end face 10b of the chuck 10, and can be set at another position, as mentioned before. In this case, the value of the movement quantity Mx naturally changes by the setting position of the origin GO.

When the chuck 10 is on a waiting position, the front end face 10b of the chuck 10 is on the Z-axis, and the end face 60a of the workpiece 60 grasped by the chuck 10 is on the Z-axis, then the size of the movement quantity Mx corresponds with the length L above-mentioned. The movement quantity computing portion 41 transfers the computed movement quantity Mx to the shift quantity detecting operation control portion 37. The shift quantity detecting operation control portion 37 receiving this movement quantity Mx transfers the command for moving and driving the chuck 10 in the X-axis direction to the driving control portion 40, together with the movement quantity Mx (the step STP102 of FIG. 7). The driving control portion 40 receiving this moves and drives the table 3 in the direction as shown by the arrow A of the X-axis direction the transferred movement quantity Mx so as to position, thereby the chuck 10 is moved in X-axis direction the movement quantity Mx so as to position, as shown by the full line of FIG. 2. Then, the cutting position KI in the workpiece 60 is located on the Z-Y plane of X=Mx.

Next, the shift quantity detecting operation control portion 37 instructs the driving control portion 40 to move the torch 15 in the Z-axis direction (step STP103 of FIG. 7). The driving control portion 40 receiving this moves and drives the head body 11 in the direction as shown by the arrow F which is downward along the Z-axis direction through the moving and driving machine 40a concerning the head body 11 so as to downwardly move the torch 15 along the Z-axis.

A sensor 70 is provided with the torch 15, which detects the distance between a top end 15a of the torch 15 and the surface of the workpiece 60 opposing to the direction which the torch 15 faces (in this case, the Z-axis direction) in Z-axis direction and outputs an arrival signal S1 when this distance becomes to be the distance NW of a predetermined size. The arrival judgment portion 43 judges whether the arrival signal S1 is output or not from this distance sensor 70. Then, the torch 15 is downwardly moved and driven as mentioned above, the distance sensor 70 outputs the arrival signal S1 when the distance between the top end 15a of the torch 15 and the workpiece 60 becomes to be the distance NW, as shown in FIG. 8, and the arrival judgment portion 43 judges that the arrival signal S1 is output (step STP104 of FIG. 7). The command of the movement stop of the torch 15 in the Z-axis direction is given to the driving control portion 40 on the basis of the judgement results from the arrival judgment portion 43 (step STP105 of FIG. 7).

The driving control portion 40 receiving this stops the head body 11 through the moving and driving machine 40a concerning the head body 11 so as to stop the movement of the torch 15. That is, the torch 15 is positioned at the position where the distance in the Z-axis direction between its top end 15a and the workpiece 60 becomes to be the distance NW.

Subsequently, the shift quantity detecting operation control portion 37 instructs the shift quantity computing portion 42 to compute the shift quantity TMz in a longitudinal direction (step STP106 of FIG. 7). A well-known movement quantity measuring means 40b is provided with the moving and driving machine 40a concerning head body 11, for measuring a movement quantity Mz in the Z-axis direction when the head body 11 is moved and driven by the moving and driving machine 40a in the Z-axis direction. Accordingly, the shift quantity computing portion 42 computes and obtains a Z-axis coordinate position PZ1 of the top end 15a of the torch 15 from the movement quantity Mz shown by the movement quantity measuring means 40b when the arrival signal S1 is output, and furthermore, reads out the longitudinal dimension H of the workpiece 60 of the workpiece informations WJ stored in the workpiece information memory 29, and computes the shift quantity TMz in the longitudinal direction of the central axis CT10 of the workpiece 60 from the coordinate position PZ1, the longitudinal dimension H and the distance NW (constant value) between the top end 15a of the torch 15 and the workpiece 60.

That is, as shown in FIG. 8, a Z-axis coordinate position PZ10 of the central axis CT10 of the workpiece 60 is;

(the Z-axis coordinate position PZ1 of the top end 15a of the torch 15)−(the size of the distance NW)−(½ of the size of the longitudinal dimension H).

Then, this coordinate position PZ10 is obtained as the shift quantity TMz in the longitudinal direction which the central axis CT10 is shifted from the X-Y plane of Z=0 in the Z-axis direction (plus value as shown in FIG. 8). The shift quantity TMz in the longitudinal direction computed in this way is transferred to the shift quantity memory 45 so as to be stored.

Subsequently, the shift quantity detecting operation control portion 37 instructs the driving control portion 40 to retract the torch 15 in the Z-axis direction (step STP107 of FIG. 7). The driving control portion 40 receiving this upwardly moves and drives the head body 11 in the Z-axis direction through the moving and driving machine 40a concerning the head body 11 so as to position the head body 11 at a predetermined waiting position before-mentioned. Then, the torch 15 is also upwardly retracted along the Z-axis and is positioned at a predetermined waiting position before-mentioned.

Subsequently, the shift quantity detecting operation control portion 37 instructs the driving control portion 40 to rotate and drive the chuck 1.0 (step STP108 of FIG. 7). The driving control portion 40 receiving this rotates the chuck 10 at 90 degrees in the direction as shown by the arrow U of FIG. 8 from the orient position through the driving machine 40a concerning the chuck 10 so as to position. Then, the workpiece 60 is rotated 90 degrees, and is located as shown in FIG. 9 in such a manner that the longitude of the workpiece 60 is in the Y-axis direction in FIG. 8 and the lateral is in the Z-axis direction in FIG. 8.

Subsequently, the shift quantity detecting operation control portion 37 instructs the driving control portion 40 to move and drive the torch 15 in the Z-axis direction (step STP109 of FIG. 7). The driving control portion 40 receiving this moves and drives the head body 11 downwardly through the moving and driving machine 40a concerning head body 11 so as to move and drive the torch 15 downwardly along the Z-axis. In this way, the torch 15 is downwardly moved and driven, the arrival signal S1 is output by the distance sensor 70 as mentioned before at the time the distance between the top end 15a of the torch 15 and the workpiece 60 in the Z-axis direction becomes to be the distance NW, and then, the arrival judgment portion 43 judges that the arrival signal S1 is output (step STP110 of FIG. 7). The command of the movement stop of the torch 15 in the Z-axis direction is given to the driving control portion 40 on the basis of the judgment results from the arrival judgment portion 43 (step STP111 of FIG. 7). The driving control portion 40 receiving this stops the head body 11 through the moving and driving machine 40a concerning the head body 11 so as to stop the movement of the torch 15. That is, the torch 15 is positioned at the position where the distance between its top end 15a and the workpiece 60 in the Z-axis direction becomes to be the distance NW, as shown in FIG. 9.

Subsequently, the shift quantity detecting operation control portion 37 instructs the shift quantity computing portion 42 to compute a shift quantity in a lateral direction TMy (step STP112 of FIG. 7). That is, the shift quantity computing portion 42 computes and obtains a Z coordinate position PZ2 of the top end 15a of the torch 15 from the movement quantity Mz which the movement quantity measuring means 40b shows when the arrival signal S1 is output, and furthermore, read out the lateral dimension W of the workpiece 60 of the workpiece information WJ stored in the workpiece information memory 29, and the shift quantity in the lateral direction TMy of the central axis CT10 of the workpiece 60 is computed from the coordinate position PZ2, the lateral dimension W and the distance NW (constant value) between the top end 15a of the torch 15 and the workpiece 60.

Figure 9:
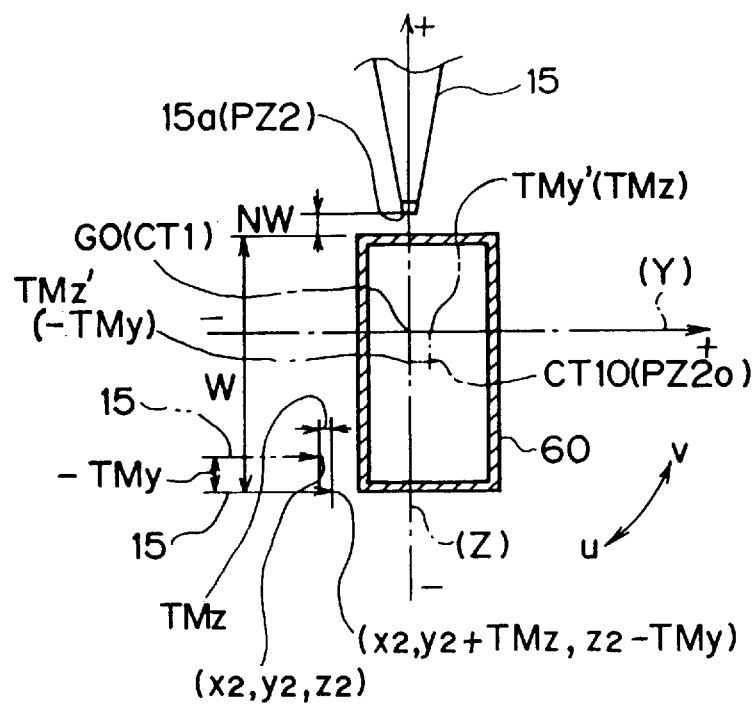
FIG. 9 is a view showing the state that shift quantity is detected concerning a workpiece which is a square pipe.

That is, as shown in FIG. 9, in this state, a Z coordinate position PZ20 of the central axis CT10 of the workpiece 60 is;

(the coordinate position PZ2 of the top end 15a of the torch 15)–
(the size of the distance NW)–(½ of the size of the lateral dimension W).

Then, this coordinate position PZ20 is obtained as a shift quantity TMz' (minus value as shown in FIG. 9) which central axis CT10 is shifted from the X-Y plane of Z=0 in the Z-axis direction in the state as shown in FIG. 9.

However, as mentioned before, since the workpiece 60 is rotated and moved in the direction as shown by the arrow U in the figure with the axial center CT1 which is the X-axis as its center, −1 time of the shift quantity TMz' in the state as shown in FIG. 9 is equal to the shift quantity in the lateral direction TMy which the central axis CT10 is shifted from the X-axis in the Y-axis direction in the state as shown in FIG. 8, that is, in the standard state that the chuck 10 is on the orient position and the workpiece 60 is not rotated and moved. The shift quantity of the lateral direction TMy computed in this way is transferred to the shift quantity memory 45 so as to be stored.

Thereafter, the shift quantity detecting operation control portion 37 instructs the driving control portion 40 to position at a waiting position (step STP113 of FIG. 7). The driving control portion 40 receiving this respectively moves and drives the table 3, the saddle 6, the head body 11, the first head member 12 and the second head member 13 through the respective moving and driving machines 40a concerning them and the chuck 10 so as to be positioned to the predetermined waiting positions again, and the chuck 10 is also rotated 90 degrees in the direction as shown by the arrow V from the state as shown in FIG. 9 so as to be positioned to the former position. In this way, the processes of the shift quantity detecting program ZPR all finish.

After the step STP2 of FIG. 4 finishes, the program advances to a step STP3. That is, an operator inputs a command of machining start C2 through the keyboard 22. The command C2 is transferred to the main control portion 21, and the main control portion 21 receiving this instructs the program reading amendment portion 49 to read out and amend the machining program PRO. Accordingly, the program reading amendment portion 49 reads out the machining program PRO from the machining program memory 36, and the read out machining program PRO is amended by the method explained hereunder so as to transfer to the machining control portion 46.

The machining control portion 46 interprets the transferred machining program PRO in order. That is, the machining control portion 46 gives various kinds of commands based on the interpretation of the machining program PRO to the driving control portion 40 and the laser generating control portion 47 and the like, in order. The driving control portion 40 moves and drives and positions the table 3, the saddle 6, the chuck 10, the head body 11, the first head member 12 and the second head member 13 on the basis of the commands from the machining control portion 46 through the respective moving and driving machines 40a concerning them. Besides, the laser generating control portion 47 generates or stops laser beam by operating or stopping a laser generator (not shown) on the basis of the commands from the machining control portion 46. Then, cutting machining is desirably executed on the workpiece 60 in such a manner that the workpiece 60 set on the chuck 10 and the head body 11 are relatively moved three-dimensionally in the X-axis, the Y-axis and the Z-axis directions and the direction of the top end 15a of the torch 15 is changed three-dimensionally with respect to the workpiece 60.

In the present embodiment, the end machining cutting a side of the workpiece 60 which is a square pipe by a plane is referred, as described before. The concrete contents of the machining program PRO which designates this machining and the concrete motions of the respective portions of the laser beam machine 1 based on the machining program PRO are clear in a well-known technique.

Figure 15:
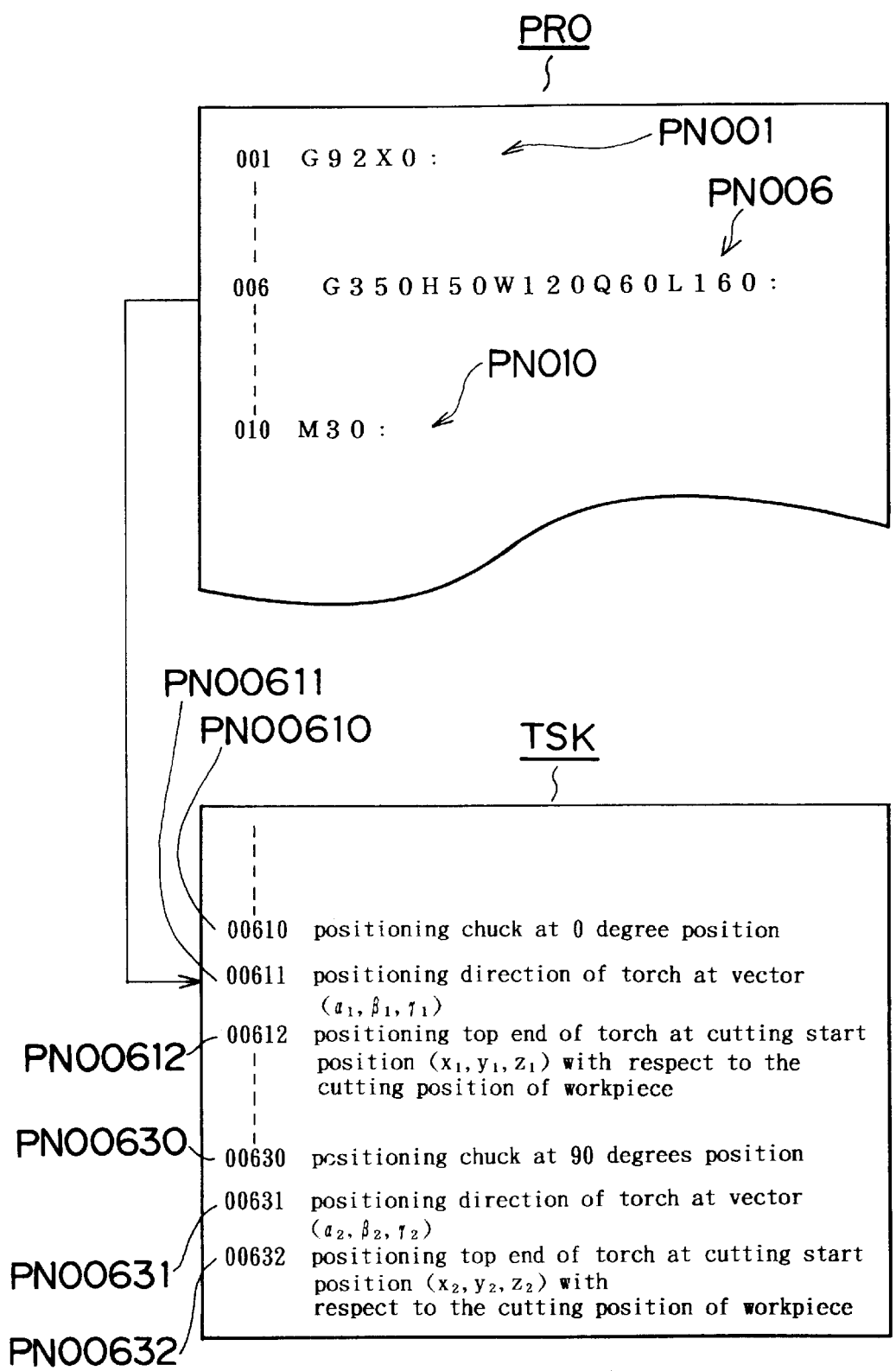
FIG. 15 is a typical view briefly showing contents of a machining program.

Amendment procedures in the program reading amendment portion 49 will be now explained. That is, a plurality of processes, PN001(coordinate system setting) . . . , PN006 (actual machining operation) . . . , PNO10 (program end) and the like are included in the machining program PRO, for instance, as shown in FIG. 15 as simplified types. Furthermore, a plurality of processes, PN00610, PN00611, PN00612 . . . , PN00630, PN00631, PN00632 . . . , and the like are included as inside procedure task TSK in the process PN006 which instructs actual machining operation.

When the program reading amendment portion 49 reading out the machining program PRO reads out the process PN006 as shown in FIG. 15, the processes of this inside procedure task TSK are scanned in order. When the process instructing the rotation positioning with the X-axis of the chuck 10 as its center is scanned as the process PN00610, PN00630 of FIG. 15, the process for positioning of the top end 15a of the torch 15, firstly appearing after the process, to the cutting start position beyond the distance NW from the cutting position of a workpiece, for instance, the contents of the process PN00612, PN00632 of FIG. 15 are amended on the basis of the process. On this occasion, [0 degree] of the process PN00610 in FIG. 15 shows the orient position and [90 degrees] of the process PN00630 shows the position rotating 90 degrees from the orient position in the direction as shown by the arrow U of FIG. 8.

For instance, in order to amend the process PN00612 of FIG. 15, the program reading amendment portion 49 refers to the angle position of the chuck 10 [0 degree] which is the orient position indicated at the process PN00610 scanned, and the coordinate position of the cutting start position indicating in the process PN00612 ($x_1$, $y_1$, $z_1$) are changed into ($x_1$, $y_1$+TMy, $z_1$+TMz) on the basis of the shift quantity in the longitudinal direction TMz and the shift quantity in the lateral direction TMy stored in the shift quantity memory 45. In this way, the process PN00612 amended in the program reading amendment portion 49 is interpreted by the machining control portion 46, and the saddle 6 and the head body 11 are moved and driven by the instruction on the basis of the interpretation, then, the top end 15a of the torch 15 is positioned with respect to the chuck 10 so as to be the following.

That is, before executing the command on the basis of the process PN00612 as shown in FIG. 15, the command based on the process PN00610 is executed, so the chuck 10 is on the orient position and the workpiece 60 is in the state as shown in FIG. 8. In this state, as mentioned before, the workpiece 60 is shifted the shift quantity in the longitudinal direction TMz in the Z-axis direction, the shift quantity in the lateral direction TMy in the Y-axis direction. Then, if the command based on the process PN00612 before amendment is executed as it is, the top end 15a of the torch 15 (briefly shown by the arrow in FIG. 8) is positioned at the coordinate position ($x_1$, $y_1$, $z_1$) as shown by the two dot chain line of FIG. 8, and is positioned at the position shifted from desired cutting position.

However, in the present embodiment, the process PN00612 is modified, as mentioned before. As a result, as shown by the arrow of the full line in FIG. 8, the top end 15a of the torch 15 is positioned at the proper coordinate position ($x_1$, $y_{1+}$TMy, $z_{1+}$,TMz) amending corresponding to the shift quantity in the longitudinal direction TMz and the shift quantity in the lateral direction TMy of the workpiece 60, then, is positioned at the desired cutting position of the workpiece set being shifted. On this occasion, since the command by the incremental coordinate based on the coordinate position ($x_1$, $y_{1+}$TMy , $z_{1+}$TMz) modified at the process PN00612 is given in the other process (not shown) subsequent to the process PN00612, the torch 15 is fed corresponding to the actual position of the shifted workpiece 60, then correct machining is realized.

In order to modify the process PN00632 of FIG. 15, for instance, the program reading amendment portion 49 refers to the angle position of the chuck 10 [90 degrees] which is the position rotated 90 degrees from the orient position in the direction as shown by the arrow U of FIG. 8 indicated at the process PN00630 scanned, and the coordinate position of the cutting start position indicating in the process PN00632 ($x_2$, $y_2$, $z_2$) is changed into ($x_2$, $y_2$+TMz, $z_2$−TMy) on the basis of the shift quantity in the longitudinal direction TMz and the shift quantity in the lateral direction TMy stored in the shift quantity memory 45.

In this way, the process PN00632 amended in the program reading amendment portion 49 is interpreted by the machining control portion 46, and the saddle 6 and the head body 11 are moved and driven by the instruction on the basis of the interpretation, then, the top end 15a of the torch 15 is positioned with respect to the chuck 10 so as to be the following.

That is, before executing the command on the basis of the process PN00632 as shown in FIG. 15, the command based on the process PN00630 is executed, so the chuck 10 is on the position ratated 90 degrees from the orient position in the direction as shown by the arrow U in the figure and the workpiece 60 is in the state as shown in FIG. 9. In this state, as mentioned before, the workpiece 60 is shifted the shift quantity TMz' equal to −1 time of the shift quantity of the lateral direction TMy in the Z-axis direction, the shift quantity TMy' equal to the shift quantity in the longitudinal direction TMz in the Y-axis direction. Then, if the command based on the process PN00632 before amendment is executed as it is, the top end 15a of the torch 15 is positioned at the coordinate position ($x_2$, $y_2$, $z_2$) as shown by the two dot chain line of FIG. 9, and is positioned at the position shifted from desired cutting position. However, in the present embodiment, the process PN00632 is modified, as mentioned before. As a result, as shown by the arrow of the full line in FIG. 9, the top end 15a of the torch 15 is positioned at the coordinate position ($x_2$, $y_2$+TMz $z_2$−TMy) amending corresponding to the shift of the workpiece 60, then, is positioned at the desired cutting position.

On this occasion, since the command by the incremental coordinate based on the coordinate position ($x_1$, $y_2$+TMz, $z_2$−TMy) modified at the process PN00632 is given in the other process (not shown) subsequent to the process PN00632, the torch 15 is fed corresponding to the actual position of the shifted workpiece 60, then correct machining is realized.

On this occasion, the shift quantity in the longitudinal direction TMz and the shift quantity in the lateral direction TMy obtained at the step STP2 of FIG. 4 are detected in the position in the X-axis direction corresponding to the cutting position KI in the workpiece 60, as explained at the step STP102 of FIG. 7. In actual machining, the torch 15 is moved near the cutting position KI. Then, the movement of the torch 15 amended on the basis of the shift quantity TMz, TMy detected in the cutting position KI is further correct in comparison with the shift quantity obtained at other place, and accuracy of machining is increasing.

As mentioned before, in order to compose the machining program PRO with the laser beam machine 1 in the present embodiment, necessary information is briefly and correctly input only exchanging with interactive mode between the laser beam machine 1 and an operator through the shape pattern select sheet KPS and the code parameter input sheet CPN, as explained at the steps STP12, STP13 of the subprogram SBP of FIG. 4, complex calculation by a worker is not necessary, it is not necessary to memory shapes by teaching, then long time or skill is not necessary. Besides, since CAD/CAM machine of separate type of conventional way is not necessary to provide, it is convenient.

Furthermore, even if the central axis CT10 of the workpiece 60 is not correctly positioned on the X-axis which is the axial center CT1 of the chuck 10 when the workpiece 60 is set by the chuck 10, the shift of the workpiece 60 is detected by the shift quantity detecting program ZPR, the movement of the torch 15 can be briefly modified on the basis of the detected shift quantity TMz, TMy when the machining program PRO is executed, so it's very convenient.

In case where the workpiece to be machined is not a square pipe, but a round pipe, the shift quantity detecting program ZPR to be read out and executed at the step STP2 of FIG. 4 is the program for round pipe slightly different from the contents of the program for a square pipe as shown in FIG. 7. For instance, in case of a workpiece 61 which is a round pipe, the shift quantity detecting program ZPR is shown in FIG. 12.

In the concrete, the step STP106 (FIG. 7) is deleted in comparison with the shift quantity detecting program ZPR as shown in FIG. 7, a step STP200 (FIG. 12) is entered between the step STP105 and the step STP107, the step STP112 (FIG. 7) is deleted and steps STP201, STP 202 (FIG. 12) are entered between the steps STP111 and STP113.

Figure 12:
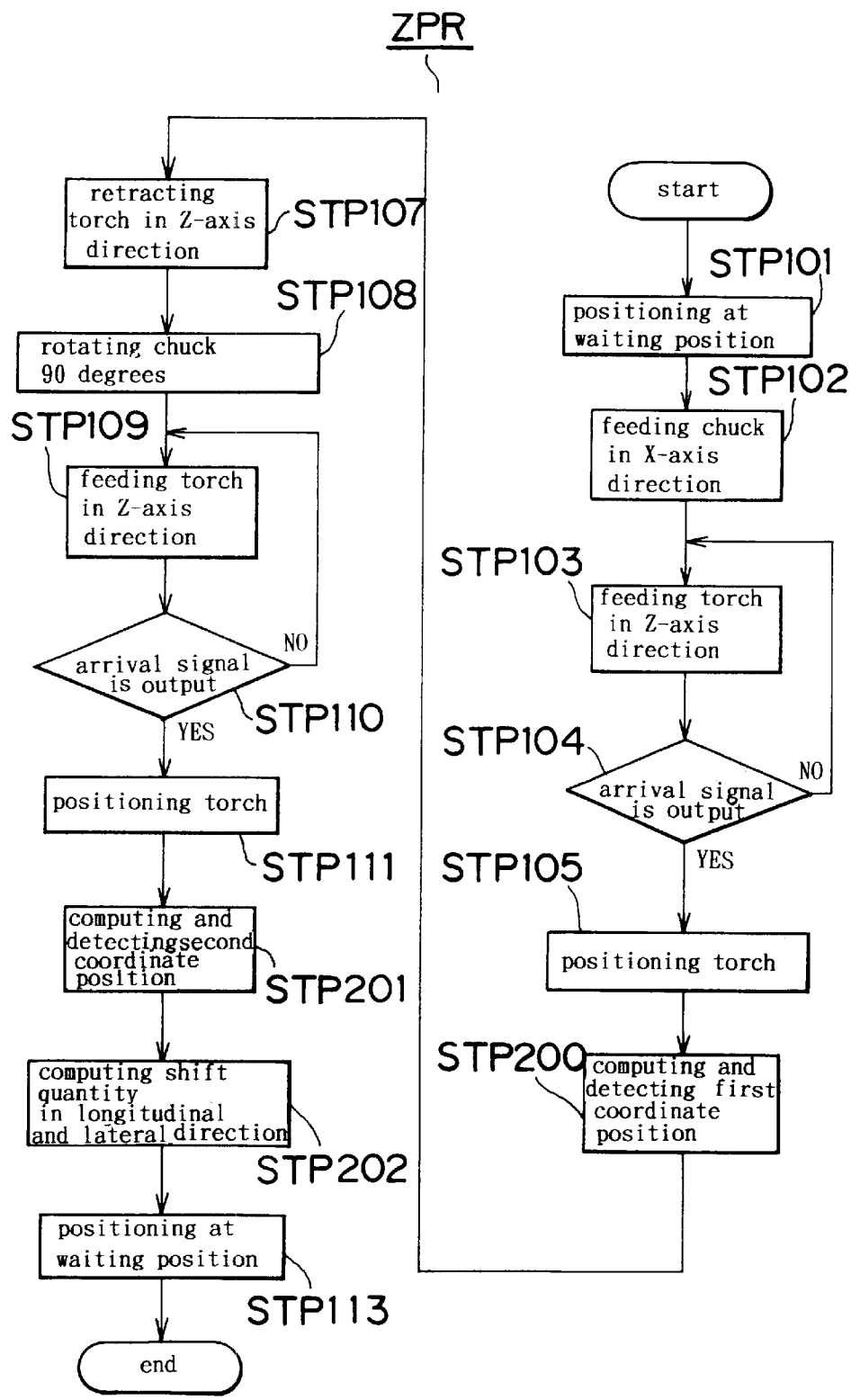
FIG. 12 is a flowchart showing contents of the shift quantity detecting program in an another example.
Figure 13:
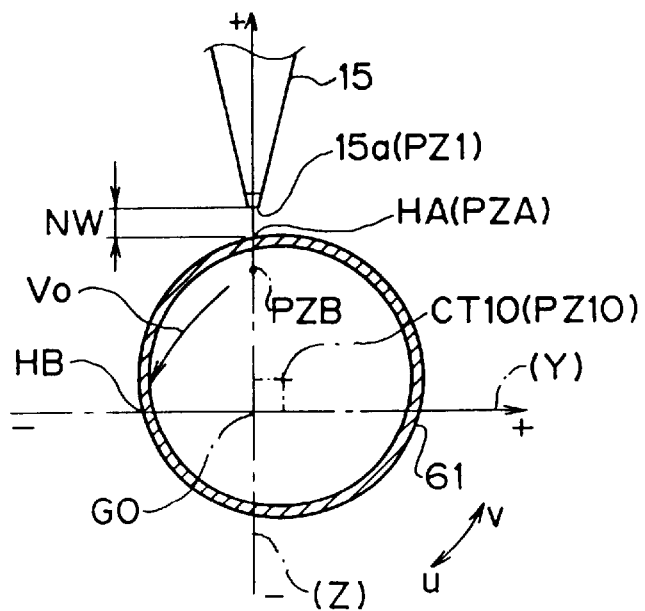
FIG. 13 is a view showing the state that shift quantity is detected concerning a workpiece which is a round pipe.

That is, in case where the workpiece 61 which is a round pipe, the state is as shown in FIG. 13 at the time the process of the step STP105 based on the shift quantity detecting program ZPR finishes. Subsequently, the program enters in the step STP200 of FIG. 12, the shift quantity detecting operation control portion 37 instructs the coordinate position detecting portion 51 to detect a first coordinate position PZA, that is, the coordinate position on the Y-Z coordinate concerning the surface position HA of the workpiece 61 facing to the top end 15a of the torch 15 in the Z-axis direction. Accordingly, the coordinate position detecting portion 51 obtains a coordinate position PZ1 on the Y-Z coordinate of the top end 15a of the torch 15 (the Y-axis component is 0 since it is on the Z-axis) by computing from the movement quantity Mz which the movement quantity measuring means 40b indicates when the arrival signal S1 is output. From this coordinate position PZ1 and the distance NW between the top end 15a of the torch 15 and the workpiece 60 (constant value), the first coordinate position PZA of the surface position HA (the Y-axis component is 0 since it is on the Z-axis) is detected. The first coordinate position PZA computed and detected is transferred to and stored in the coordinate position memory 52.

Figure 14:
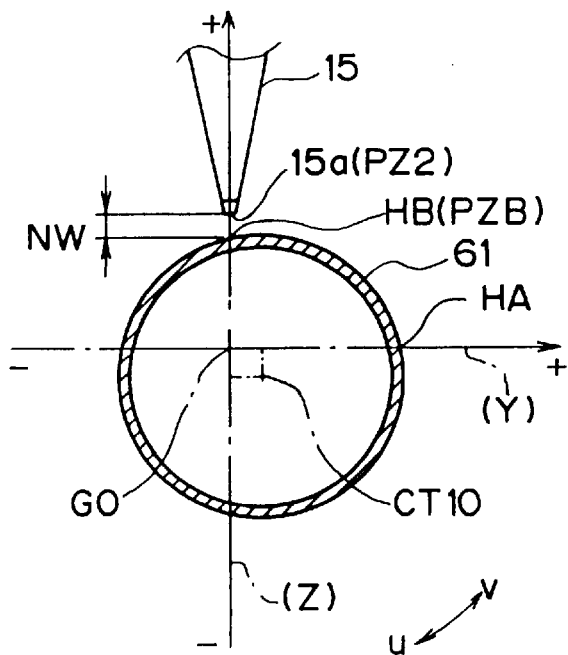
FIG. 14 is a view showing the state that shift quantity is detected concerning a workpiece which is a round pipe.

After the procedure of the step STP200 of FIG. 12 finishes as mentioned before, the procedures of the steps STP107 through STP111 of FIG. 12 are executed in a similar way to the case of a square pipe explained in FIG. 7. At the time the step STP111 finishes, the state of FIG. 13 is changed into the state as shown in FIG. 14 where the workpiece 61 is rotated 90 degrees in the direction as shown by the arrow U in the figure with the X-axis as its center. Then, the program enters in the step STP201 of FIG. 12, and the shift quantity detecting operation control portion 37 instructs the coordinate position detecting portion 51 to detect a second coordinate position PZB, that is, the coordinate position on the Y-Z coordinate concerning a surface position HB of the workpiece 61 facing to the top end 15a of the torch 15 in the Z-axis direction in the state of FIG. 14.

Then, the coordinate position detecting portion 51 obtains a coordinate position PZ2 of the top end 15a of the torch 15 (the Y-axis component is 0 since it is on the Z-axis) by computing from the movement quantity Mz which the movement quantity measuring means 40b indicates when the arrival signal S1 is output. From this coordinate position PZ2 and the distance NW between the top end 15a of the torch 15 and the workpiece 60 (constant value), the second coordinate position PZB of the surface position HB in the state in FIG. 14 (the Y-axis component is 0 since it is on the Z-axis) is computed and detected. The second coordinate position PZB computed and detected is transferred to and stored in the coordinate position memory 52. In this way, the program enters in the step STP202 when the step STP201 of FIG. 12 finishes, and the shift quantity detecting operation control portion 37 instructs the shift quantity computing portion 42 to compute the shift quantity in the longitudinal direction TMx and the shift quantity in the lateral direction TMy.

The shift quantity computing portion 42 receiving this computes the shift quantity in the longitudinal direction TMx and the shift quantity in the lateral direction TMy on the basis of the first coordinate position PZA and the second coordinate position PZB stored in the coordinate position memory 52. That is, in the standard state that the workpiece 61 is not rotated as shown in FIG. 13, that is, in the state that the chuck 10 is on the orient position, the coordinate position on the Y-Z coordinate of the surface position HA of the workpiece 61 is the first coordinate position PZA, and the coordinate position of the surface position HB is the value obtained by coordinate transformation, rotating and moving the second coordinate position PZB in the Z-Y coordinate plane 90 degrees (as shown by an arrow VO in FIG. 13) in the direction as shown by the arrow V in the figure.

Accordingly, the shift quantity computing portion 42 obtains the coordinate position on the Y-Z coordinate of the surface positions HA, HB of the workpiece 61 in the standard state as shown in FIG. 13.

The diameter of the circle of the workpiece 61 perpendicular to the central axis CT10 in the sectional shape is one of the workpiece 61, and is already input as the workpiece information WJ. Accordingly, this size is already known. Then, its equation is obtained by the condition, such as the passage of the coordinate positions of the surface positions HA, HB in the standard state as shown in FIG. 13. Accordingly, making use of this, the shift quantity computing portion 42 obtains the coordinate position of the center of the circle on the Z-Y coordinate in the standard state as shown in FIG. 13, that is, the coordinate value PZ10 of the central axis CT10 of the workpiece 61. The shift quantity computing portion 42 sets the Z coordinate component of the coordinate value PZ10 obtained in this way as the shift quantity in the longitudinal direction TMx and sets the Y coordinate component of the coordinate value PZ10 as the shift quantity in the lateral direction TMy, and these shift quantity in the longitudinal direction TMx and the shift quantity in the lateral direction TMy are transferred to the shift quantity memory 45 so as to be stored.

When the step STP202 of FIG. 12 finishes in this way, the step STP113 of FIG. 12 is executed in a similar way to the case of a square pipe, and then, the procedures based on the shift quantity detecting program ZPR all finish. Thereafter, as shown in the step STP3 of FIG. 4, the amendment when the machining program PRO is executed may be executed in a similar way to the case of a square pipe. By doing so, correct machining is easily realized in the case of a round pipe also.

In the respective embodiments explained heretofore, the pipe which section is square and the pipe which section is round are referred. For the pipe which section is triangle or hexagon, for instance, the machining program can be composed, shift quantity can be detected, and machining can be executed amending in a similar way. In this case, the shape patterns according to the triangle shape pipe or the hexagon shape pipe in the step STP12 as shown in FIG. 4 are displayed so as to be selected by an operator.

Furthermore, in the above-mentioned embodiments, a laser beam machine is used as a linear processing machine tool. But, any machine tool, such as plasma cutting machine tool and a gas cutting machine tool, may be used as a linear processing machine tool as long as three-dimensional machining can be linearly executed on a workpiece, adding to the laser beam machine.

Besides, any type can be used as a pipe rotating and holding means, adding to the chuck type as shown in FIG. 2, and the seperate type of pipe holding means and pipe rotating means can be used. Besides, a plurality of pipe rotating and holding means can be naturally provided adding to the providing one means.

The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. A three-dimensional linear processing machine capable of performing a three-dimensional linear cutting machining on a pipe with a cutting torch, comprising:
   a pipe rotating and holding means, capable of positioning and holding the pipe to be machined at any rotational angle position around an axial center of the pipe;

a first memory means for storing machining modes concerning said pipe classified into a plurality of shape patterns by machining edge;

a second memory means for storing dimensional data items necessary for machining of said shape pattern concerning respective shape patterns classified by said machining shape;

a display;

a shape pattern display control means for displaying said plurality of shape patterns on said display, selectable by an operator;

an input means of said shape pattern;

a dimensional data display control means for selecting and displaying on said display said dimensional data item concerning said input shape pattern from said dimensional data items stored in said second memory means concerning a specific shape pattern input from said input means of said shape pattern;

an input means of dimensional data capable of inputting dimensional data corresponding to said dimensional data item on the basis of said dimensional data item displayed on said display;

a linear machining program composing means for composing three-dimensional linear machining program concerning said pipe to be machined on the basis of said dimensional data corresponding to the input dimensional data item and said input shape pattern;

a third memory means for storing a shift quantity detecting program for measuring installation position shift quantity of said pipe with respect to said pipe rotating and holding means when said pipe to be machined is installed on said pipe rotating and holding means;

a distance measuring means provided at said cutting torch, capable of detecting and computing a distance between a surface of said pipe to be machined and said cutting torch;

said shift quantity detecting program having a process for measuring installation position shift quantity of said pipe to be machined with respect to said pipe rotating and holding means through said distance measuring means by computing shift quantity measurement starting position corresponding to cutting position of said pipe to be machined on the basis of dimensional data concerning said pipe to be machined input from said input means of said dimensional data, by positioning said cutting torch at said shift quantity measurement starting position computed, and by moving said cutting torch with respect to said pipe from said shift quantity measurement starting position;

an installation position shift quantity measuring means for reading out said shift quantity detecting program stored in said third memory means and for measuring installation position shift quantity of said pipe held by said pipe rotating and holding means; and a machining control means for executing said three-dimensional linear machining program concerning said pipe to be machined composed by said linear machining program composing means on the basis of measuring result of said installation position shift quantity measuring means, amending said installation position shift quantity by said pipe rotating and holding means, and for machining said pipe to be machined held by said pipe rotating and holding means.

2. The three dimensional linear processing machine as set forth in claim 1, wherein said shape pattern has a plurality of shape patterns concerning a square pipe which section is square.

3. The three dimensional linear processing machine as set forth in claim 1, wherein said shape pattern has a plurality of shape patterns concerning a round pipe which section is round.

4. The three dimensional linear processing machine as set forth in claim 1, wherein a plurality of the shift quantity detecting program for measuring installation position shift quantity of said pipe with respect to said pipe rotating and holding means are provided corresponding to said shape patterns, and the installation position shift quantity measuring means for measuring the installation position shift quantity of said pipe held by said pipe rotating and holding means reads out and execute the shift quantity detecting program corresponding to said input shape pattern.

5. A method of composing and controlling a machining program in a three-dimensional linear processing machine, said three-dimensional linear processing machine capable of performing a three-dimensional linear cutting machining on a pipe with a cutting torch, in which said machine further comprising a pipe rotating and holding means, capable of positioning and holding the pipe to be machined at any rotational angle position around an axial center of the pipe;

a first memory means for storing machining modes concerning said pipe classified into a plurality of shape patterns by machining shape;

a second memory means for storing dimensional data items necessary for machining of said shape pattern concerning respective shape patterns classified by said machining shape;

a display;

a shape pattern display control means for displaying said plurality of shape patterns on said display, selectable by an operator;

an input means of said shape pattern;

a dimensional data display control means for selecting and displaying on said display by selecting said dimensional data item concerning said input shape pattern from said dimensional data items stored in said second memory means concerning a specific shape pattern input from said input means of said shape pattern;

an input means of dimensional data capable of inputting dimensional data corresponding to said dimensional data item on the basis of said dimensional data item displayed on said display;

a linear machining program composing means for composing three-dimensional linear machining program concerning said pipe to be machined on the basis of said dimensional data corresponding to the input dimensional data item and said input shape pattern;

a third memory means for storing a shift quantity detecting program for measuring installation position shift quantity of said pipe with respect to said pipe rotating and holding means when said pipe to be machined is installed on said pipe rotating and holding means;

a distance measuring means provided at said cutting torch capable of detecting and computing a distance between a surface of said pipe to be machined and said cutting torch;

said shift quantity detecting program having a process for measuring installation position shift quantity of said pipe to be machined with respect to said pipe rotating and holding means through said distance measuring means by computing shift quantity measurement starting position corresponding to cutting position of said pipe to be machined on the basis of dimensional data concerning said pipe to be machined input from said input means of said dimensional data, by positioning said cutting torch at said shift quantity measurement starting position computed, and by moving said cutting torch with respect to said pipe from said shift quantity measurement starting position;

an installation position shift quantity measuring means for reading out said shift quantity detecting program stored in said third memory means and for measuring installation position shift quantity of said pipe held by said pipe rotating and holding means; and a machining control means for executing said three-dimensional linear machining program concerning said pipe to be machined composed by said linear machining program composing means on the basis of measuring result of said installation position shift quantity measuring means, amending said installation position shift quantity by said pipe rotating and holding means, and for machining said pipe to be machined held by said pipe rotating and holding means; said method comprising:

when said machining program is composed;

indicating to an operator a plurality of shape patterns stored in said first memory means by said shape pattern display control means through said display;

indicating to an operator dimensional data items concerning said input shape pattern through said display selected from said second memory means by said dimensional data display control means concerning specific shape pattern input by an operator through said input means of said shape pattern corresponding to the indication of said shape pattern; and composing a three-dimensional linear machining program concerning a pipe to be machined by said linear machining program composing means on the basis of dimensional data concerning said specific shape pattern input by an operator through said input means of said dimensional data corresponding to the indication of said dimensional data item; whereby various kinds of data, such as longitudinal dimension, lateral dimension, angle, length, diameter, and code parameter are input with interactive mode between an operator and the three-dimensional linear processing machine when machining program is composed.

6. The method of composing and controlling a machining program in the three dimensional linear processing machine as set forth in claim 5 wherein said three dimensional linear processing machine is a three dimensional laser beam machine.

7. The method of composing and controlling a machining program in the three dimensional linear processing machine as set forth in claim 5 wherein said three dimensional linear processing machine is a three dimensional gas cutting processing machine.

8. The method of composing and controlling a machining program in the three dimensional linear processing machine as set forth in claim 5 wherein said three dimensional linear processing machine is a three dimensional plasma cutting processing machine.

* * * * *